US006444771B1

(12) United States Patent
Yamaguchi et al.

(10) Patent No.: US 6,444,771 B1
(45) Date of Patent: *Sep. 3, 2002

(54) ACRYLIC ACID-MALEIC ACID COPOLYMER (OR ITS SALT), ITS PRODUCTION PROCESS AND USE, AND PRODUCTION PROCESS FOR AQUEOUS MALEIC SALT SOLUTION WITH LOW IMPURITY CONTENT

(75) Inventors: Shigeru Yamaguchi, Yao; Yoshihiro Maeda, Ibaraki; Tamao Ishida, Osaka, all of (JP)

(73) Assignee: Nippon Shokubai Co. Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/376,177

(22) Filed: Aug. 17, 1999

(30) Foreign Application Priority Data

| Sep. 8, 1998 | (JP) | 10-254334 |
| Dec. 28, 1998 | (JP) | 10-373894 |
| Aug. 11, 1999 | (JP) | 11-228035 |
| Aug. 11, 1999 | (JP) | 11-228036 |

(51) Int. Cl.$^7$ .............................................. C08J 20/06
(52) U.S. Cl. ..................... 526/317.1; 526/79; 526/80; 526/81; 526/271; 526/318.2
(58) Field of Search ............................... 526/79, 80, 81, 526/271, 317.1, 318.2; 562/590

(56) References Cited

U.S. PATENT DOCUMENTS

| 5,175,361 A | 12/1992 | Denzinger et al. ......... 562/590 |
| 5,733,857 A | 3/1998 | Yamaguchi et al. ........ 510/361 |

FOREIGN PATENT DOCUMENTS

| CA | 2038332 | | 9/1991 |
| EP | 0 075 820 | A1 | 4/1983 |
| EP | 0 668 298 | A1 | 8/1995 |
| JP | 51-140986 | A | 12/1976 |
| JP | 61-36308 | A | 2/1986 |
| JP | 3-2167 | | 1/1991 |
| JP | 3-14046 | | 2/1991 |
| JP | 5-247143 | | 9/1993 |
| JP | 8-208758 | A | 8/1996 |
| JP | 2574144 | | 10/1996 |
| JP | 10-7740 | A | 1/1998 |
| WO | WO 96/02582 | A1 | 2/1996 |

*Primary Examiner*—David W. Wu
*Assistant Examiner*—Tanya Zalukaeva
(74) *Attorney, Agent, or Firm*—Haugen Law Firm PLLP

(57) ABSTRACT

The present invention provides: an acrylic acid-maleic acid copolymer (or its salt) which is excellent in performances, such as $Mg^{2+}$ scavengeability, clay dispersibility in the presence of $Mg^{2+}$, inhibitability upon $Mg(OH)_2$ scale, and inhibitability upon $CaCO_3$ scale; and a production process for such a copolymer (or its salt). The present invention further provides a production process for an aqueous maleic salt solution with a low impurity content which has the advantage of easily giving the above copolymer (or its salt). The present invention still further provides uses of the above copolymer (or its salt) having the above excellent properties.

15 Claims, No Drawings

ACRYLIC ACID-MALEIC ACID COPOLYMER (OR ITS SALT), ITS PRODUCTION PROCESS AND USE, AND PRODUCTION PROCESS FOR AQUEOUS MALEIC SALT SOLUTION WITH LOW IMPURITY CONTENT

BACKGROUND OF THE INVENTION

A. Technical Field

The present invention relates to: an acrylic acid-maleic acid copolymer (or its salt) which is excellent in performances such as metal ion scavengeability, clay dispersibility, and scale inhibitability, and has a high random degree; a production process therefor; and uses of this copolymer (or its salt) for such as detergent builders.

The present invention further relates to a production process for an aqueous maleic salt solution with a low impurity content which has the advantage of giving the above copolymer (or its salt) more excellent performance.

B. Background Art

Generally, copolymers (or their salts), as used for detergent builders, water-treating agents, various chelating agents, and so on, are required to be high both in the metal ion scavengeability and the clay dispersibility in the presence of metal ions. Thus, various maleic acid copolymers (or their salts) have been developed to satisfy these performances. Furthermore, in water-treating processes, the alkaline earth metal ion scale inhibitability is demanded as an important performance, and the use of conventionally known maleic acid copolymers (or their salts) have been recognized to improve the scale inhibitability upon calcium ion that is the main component of the scale. However, in the case where such polymers (or their salts) as improved in the metal ion scavengeability, the clay dispersibility, and the scale inhibitability upon calcium are used for detergent builders, excellent deterging effects are exhibited according to expectation in some regions, while the hygroscopicity and touch of washed clothes are bad in other regions. In addition, there are problems in that the performances, such as the detergency or the softness of fibers after washing, vary with regions where the above polymers (or their salts) are used.

The present inventors diligently studied to pursue causes of the above problems. As a result, the present inventors have found that the cause is the formation of scale due to the generation of an inactive salt (magnesium hydroxide) from magnesium ion. That is to say, they have found that the generation and deposition of magnesium hydroxide scale have a bad influence upon the hygroscopicity and touch of clothes especially in regions where the magnesium ion content in water is high. Thus, the present inventors have further found out a copolymer (or its salt) which does not only maintain conventional performance levels of the metal ion scavengeability, the clay dispersibility, and the scale inhibitability upon calcium ion, but is also at high level in the scale inhibitability upon magnesium ion as has never been studied.

By the way, the production of the maleic acid copolymer (or its salt) involves the production of an aqueous maleic salt solution which is an aqueous solution of a monomer of the maleic acid copolymer (or its salt), but the production process for the aqueous maleic salt solution has never been studied.

The present inventors considered the production process for the aqueous maleic salt solution to be particularly important, and thus studied it. As a result, the present inventors found that a specific production process can give an aqueous maleic salt solution which contains only a small amount of formed impurities such as malic acid and therefore has high purity, and further that the resultant maleic acid copolymer (or its salt) from such an aqueous maleic salt solution also contains only a small amount of impurities such as malic acid and is therefore a copolymer (or its salt) which exhibits high calcium ion scavengeability and high clay dispersibility.

SUMMARY OF THE INVENTION

A. Objects of the Invention

Thus, a first object of the present invention is to provide: an acrylic acid-maleic acid copolymer (or its salt) which is excellent with good balance in performances such as metal ion scavengeability, clay dispersibility, calcium carbonate scale inhibitability, and magnesium hydroxide scale inhibitability; a production process therefor; and uses of this copolymer (or its salt) for such as detergent builders.

A second object of the present invention is to provide a production process for an aqueous maleic salt solution which contains only a small amount of formed impurities such as malic acid and therefore has high purity.

B. Disclosure of the Invention

An acrylic acid-maleic acid copolymer (or its salt), according to the present invention, is characterized by having a magnesium ion scavengeability of 210 mg (in terms of $Mg(OH)_2$)/g or more and a magnesium hydroxide scale inhibitability of 30% or more. Preferably, this copolymer (or its salt) further has a clay dispersibility of 60% or more in the presence of magnesium ion.

Another acrylic acid-maleic acid copolymer (or its salt), according to the present invention, has a magnesium ion scavengeability of 210 mg (in terms of $Mg(OH)_2$)/g or more, a molecular weight distribution of 3.5 or less, and low-molecular fractions with a molecular weight of 1,000 or less in the ratio of 9 wt % or less to the total of the copolymer (or its salt).

A production process for an acrylic acid-maleic acid copolymer (or its salt), according to the present invention, comprises the step of copolymerizing ethylenically unsaturated monomers including acrylic acid and maleic acid in the presence of a polymerization initiator, and is characterized in that: 50 wt % or more of the maleic acid is initially charged; the maleic acid has a neutralization degree of 70~95 mol % before the polymerization initiator is charged; and the resultant acrylic acid-maleic acid copolymer (or its salt) has a neutralization degree of 50~70 mol % and a solid component concentration of 45 wt % or more at the end of the polymerization.

A detergent composition, according to the present invention, comprises the above present invention acrylic acid-maleic acid copolymer (or its salt) and a surfactant.

A detergent builder, according to the present invention, comprises the above present invention acrylic acid-maleic acid copolymer (or its salt).

A production process for an aqueous maleic salt solution, according to the present invention, is characterized by comprising the steps of: charging 80% or less of the required amount of a basic substance to produce the aqueous maleic salt solution and 80% or less of the required amount of maleic acid (or its salt) and/or maleic anhydride to produce the aqueous maleic salt solution into a reaction vessel; and then adding thereto the respective balances of water, the basic substance, and the maleic acid (or its salt) and/or maleic anhydride under conditions where the highest value of the reaction temperature will be 80° C. or higher; and this process can give an aqueous maleic salt solution with a formed malic acid content of not more than 10,000 ppm.

The present invention can provide a maleic acid/acrylic acid copolymer (or its salt), which comprises maleic acid (or its salt) of 30~70 mol % and acrylic acid (or its salt) of 70~30 mol %, and has a weight-average molecular weight of 2,000~50,000, a calcium ion scavengeability of 400 mg $CaCO_3$/g or more, a clay dispersibility of 0.6 or more, and a malic acid content of not more than 9 wt % in the solid content of the copolymer (or its salt).

These and other objects and the advantages of the present invention will be more fully apparent from the following detailed disclosure.

DETAILED DESCRIPTION OF THE INVENTION

Part I

In this part I, detailed descriptions are given on the present invention acrylic acid-maleic acid copolymer (or its salt) and its production process and use.

(Acrylic acid-maleic acid copolymer (or its salt):

The magnesium ion scavengeability of the present invention acrylic acid-maleic acid copolymer (or its salt) is defined as the mg number, in terms of magnesium hydroxide ($Mg(OH)_2$), of magnesium ion as scavenged by 1 g of the copolymer (or its salt), and, for example, can be measured by the method as described in the below-mentioned examples of some preferred embodiments. The magnesium ion scavengeability is an index to show how much magnesium ion in water the acrylic acid-maleic acid copolymer (or its salt) scavenges. The surfactant, as used for detergents, becomes insoluble upon bonding to magnesium ion in water, so that the detergency deteriorates. However, if, even when the fiber is treated with magnesium-ion-containing water, the present invention acrylic acid-maleic acid copolymer (or its salt) having high magnesium ion scavengeability is used together with the surfactant, then the surfactant is prevented from becoming insoluble, so that the detergency upon dirt such as oil dirt can be prevented from deteriorating, and further, the magnesium scale can be prevented from deposition to fibers. Such effects can lessen the variation of the performance of detergent materials, such as detergent compositions and detergent builders, with regions.

The magnesium ion scavengeability of the present invention acrylic acid-maleic acid copolymer (or its salt) is usually 210 mg/g or more (in terms of $Mg(OH)_2$ as scavenged by 1 g of the acrylic acid-maleic acid copolymer (or its salt)), preferably 220 mg (in terms of $Mg(OH)_2$)/g or more, more preferably 230 mg (in terms of $Mg(OH)_2$)/g or more, still more preferably 240 mg (in terms of $Mg(OH)_2$)/g or more. The increase in the magnesium ion scavengeability enhances the ability of the acrylic acid-maleic acid copolymer (or its salt) as the detergent builder in the presence of magnesium ion.

The clay dispersibility of the present invention acrylic acid-maleic acid copolymer (or its salt) in the presence of magnesium ion is defined as the value (%) of the absorbance as measured by the method as described in the below-mentioned examples of some preferred embodiments.

The clay dispersibility in the presence of magnesium ion is an index for evaluation of effects upon removing and uniformly dispersing the dirt such as mud dirt, thereby preventing the clay from precipitating, in the case where water, as used for washing, contains magnesium ion. To sufficiently obtain such effects, the above clay dispersibility is preferably 60% or more, and further, to prevent the deposition of mud dirt, the clay dispersibility is more preferably 70% or more, still more preferably 73% or more, most preferably 75% or more.

The clay dispersibility in the presence of magnesium ion is a numerical value to evaluate the dispersion extent of the clay in the presence of magnesium ion and the copolymer (or its salt) on the basis of the turbidity of a supernatant as produced by allowing a suspension of dispersed clay to stand stationary for a certain time. The larger numerical value shows higher clay dispersibility.

The magnesium hydroxide scale inhibitability and the calcium carbonate scale inhibitability of the present invention acrylic acid-maleic acid copolymer (or its salt) are defined as the magnesium hydroxide inhibition rate (%) and the calcium carbonate inhibition rate (%) respectively as measured by the methods as described in the below-mentioned examples of some preferred embodiments, and are indices to show how much the acrylic acid-maleic acid copolymer (or its salt) prevents the generation and deposition of the magnesium hydroxide scale and calcium carbonate scale in water systems. The larger numerical values of the above scale inhibition rates (%) show that their respective scale inhibitabilities are higher. In the case where the magnesium hydroxide scale or calcium carbonate scale is generated and deposited in water systems, bad influences are produced, for example, as follows: piping is clogged, or the detergency of detergents is lowered, or clothes are blacked (especially, the deposition of magnesium hydroxide scale to clothes will overstarch the clothes to deteriorate their hygroscopicity and touch). However, if the present invention acrylic acid-maleic acid copolymer (or its salt) having high magnesium hydroxide scale inhibitability and high calcium carbonate scale inhibitability is used, then the generation and deposition of the magnesium hydroxide scale and calcium carbonate scale can be prevented to avoid the above bad influences.

The magnesium hydroxide scale inhibitability of the present invention acrylic acid-maleic acid copolymer (or its salt) is usually 30% or more, preferably 33% or more, more preferably 35% or more, still more preferably 37% or more, to sufficiently obtain the above effects.

The calcium carbonate scale inhibitability of the present invention acrylic acid-maleic acid copolymer (or its salt) is usually 60% or more, preferably 70% or more, more preferably 75% or more, still more preferably 78% or more, yet still more preferably 80% or more, to sufficiently obtain the above effects.

The weight-average molecular weight of the present invention acrylic acid-maleic acid copolymer (or its salt) is preferably in the range of 2,000~100,000, more preferably 3,000~50,000, still more preferably 5,000~20,000, most preferably 6,000~15,000. In the case where the weight-average molecular weight is less than 2,000, the magnesium ion scavengeability tends to be so low as to deteriorate the detergency. In the case where the weight-average molecular weight exceeds 100,000, the clay dispersibility in the presence of magnesium ion or the magnesium hydroxide scale inhibitability tends to be low.

Furthermore, for more enhancing the magnesium ion scavengeability, it is very preferable that the molecular weight distribution, namely, Mw/Mn as given by dividing the weight-average molecular weight (Mw) by the number-average molecular weight (Mn), of the present invention acrylic acid-maleic acid copolymer (or its salt) is 3.5 or less, more preferably 3.0 or less, and further that the present invention acrylic acid-maleic acid copolymer (or its salt) has low-molecular fractions with a molecular weight of 1,000 or less in the ratio of 9 wt % or less, more preferably 6 wt % or less, to the total of the copolymer (or its salt).

The production process for the present invention acrylic acid-maleic acid copolymer (or its salt) is not especially limited. However, for example, the below-mentioned production process according to the present invention is preferable.

(Production process for acrylic acid-maleic acid copolymer (or its salt)):

The production process according to the present invention is a process comprising the step of copolymerizing ethylenically unsaturated monomers including acrylic acid and maleic acid in the presence of a polymerization initiator, thereby obtaining the acrylic acid-maleic acid copolymer (or its salt).

In this process, the amount of maleic acid, as initially charged, is usually 50 wt % or more, preferably 80 wt % or more, most preferably 100 wt % (initially charging the entirety), of the entirety of maleic acid as used. In the case where the amount of maleic acid, as initially charged, is smaller than 50 wt %, the amount of unreacted maleic acid is so large in the latter half of the polymerization that maleic acid cannot uniformly be introduced into the resultant copolymer (or its salt), therefore the resultant magnesium ion scavengeability is low, and the resultant magnesium hydroxide scale inhibitability is also low.

The neutralization degree of maleic acid is usually in the range of 70~95 mol %, preferably 75~90 mol %, more preferably 80~87 mol %, before the polymerization initiator is charged. In the case where this neutralization degree is less than 70 mol %, maleic acid is polymerized in the block form, so the resultant clay dispersibility in the presence of magnesium ion is low. In the case where the above neutralization degree exceeds 95 mol %, the introducing efficiency of maleic acid is so bad that the resultant magnesium ion scavengeability is so low as to deteriorate not only the detergency, but also the magnesium hydroxide scale inhibitability.

The initial solid component concentration of maleic acid is preferably 48 wt % or more, more preferably 50 wt % or more, still more preferably 53 wt % or more, of the entirety of the initial reaction liquid. In the case where the initial solid component concentration of maleic acid is less than 48 wt %, the introducing efficiency of maleic acid tends to be so bad that the resultant magnesium ion scavengeability is so low as to deteriorate not only the detergency, but also the magnesium hydroxide scale inhibitability.

The form of maleic acid, as used, may be any of maleic anhydride, maleic acid, and maleic salt, and any mixture thereof is also available. In addition, when used, maleic anhydride or maleic acid is fitly partially neutralized to a predetermined neutralization degree with an alkaline substance, if necessary. The above alkaline substance is not especially limited, but examples thereof include: alkaline metal hydroxides, such as sodium hydroxide and potassium hydroxide; ammonia; and organic amines, such as monoethanolamine. These may be used either alone respectively or in combinations with each other.

Acrylic acid is added to the reaction system by dropping preferably 70 wt % or more, more preferably 90 wt % or more, most preferably 100 wt %, of the entirety thereof as used. In the case where the ratio of acrylic acid, as dropped, is less than 70 wt %, initial acrylic acid is polymerized in the block form, so the resultant magnesium hydroxide scale inhibitability tends to be low.

The dropping duration of acrylic acid is preferably in the range of 30~240 minutes, more preferably 90~150 minutes, still more preferably 100~140 minutes. In the case where the dropping duration of acrylic acid is shorter than 30 minutes, acrylic acid is polymerized in the block form, so the resultant magnesium hydroxide scale inhibitability tends to be low. In the case where the dropping duration of acrylic acid exceeds 240 minutes, maleic acid is polymerized in the block form, so the resultant clay dispersibility in the presence of magnesium ion tends to be low.

The form of acrylic acid, as used, is, especially preferably, acrylic acid. An acrylic salt may be used by adding it to acrylic acid, if necessary. But the ratio of the acrylic salt, as added, is set to such that the neutralization degree of the acrylic acid-maleic acid copolymer (or its salt) will be in the below-mentioned range. The above acrylic salt is not especially limited, but examples thereof include: alkaline metal acrylates, such as sodium acrylate and potassium acrylate; ammonium acrylate; and organic amine salts of acrylic acid. These may be used either alone respectively or in combinations with each other.

The ratio between acrylic acid and maleic acid as used for copolymerization (acrylic acid/maleic acid (molar ratio)) is preferably in the range of 30/70~70/30, more preferably 35/65~65/35, still more preferably 40/60~60/40. In the case where the ratio of acrylic acid, as used, is less than 30/70, the resultant magnesium ion scavengeability tends to be so low as to deteriorate the magnesium hydroxide scale inhibitability. In the case where the ratio of acrylic acid, as used, exceeds 70/30, the resultant magnesium ion scavengeability tends to be low, and the resultant clay dispersibility in the presence of magnesium ion also tends to be low.

Acrylic acid and maleic acid are essentially used as the ethylenically unsaturated monomers. However, if necessary, another ethylenically unsaturated monomer may be used jointly with acrylic acid and maleic acid within the range where the effect of the present invention is not damaged.

The above other ethylenically unsaturated monomer, which can be used jointly, is not especially limited if it is copolymerizable with acrylic acid and maleic acid. But examples thereof include: unsaturated monocarboxylic acid monomers, such as methacrylic acid and crotonic acid; unsaturated dicarboxylic acid monomers and unsaturated polycarboxylic acid monomers, such as fumaric acid, itaconic acid, citraconic acid, and aconitic acid; amide monomers, such as (meth)acrylamide and t-butyl(meth)acrylamide; hydrophobic monomers, such as (meth)acrylic esters, styrene, 2-methylstyrene, and vinyl acetate; unsaturated sulfonic acid monomers, such as vinylsulfonic acid, allylsulfonic acid, methallylsulfonic acid, styrenesulfonic acid, 2-acrylamido-2-methylpropanesulfonic acid, 3-allyloxy-2-hydroxypropanesulfonic acid, sulfoethyl (meth)acrylate, sulfopropyl (meth)acrylate, 2-hydroxysulfopropyl (meth)acrylate, and sulfoethylmaleimide; neutralized products as formed by partially or entirely neutralizing the above unsaturated monocarboxylic acid monomers, the above unsaturated dicarboxylic acid monomers, the above unsaturated polycarboxylic acid monomers, or the above unsaturated sulfonic acid monomers with, for example, monovalent metals, divalent metals, ammonia, or organic amines; hydroxyl-group-containing unsaturated monomers, such as 3-methyl-2-buten-1-ol (which might be referred to as "prenol"), 3-methyl-3-buten-1-ol (which might be referred to as "isoprenol"), 2-methyl-3-buten-2-ol (which might be referred to as "isoprene alcohol"), 2-hydroxyethyl (meth)acrylate, polyethylene glycol mono(meth)acrylate, polypropylene glycol mono(meth)

acrylate, polyethylene glycol monoisoprenol ether, polypropylene glycol monoisoprenol ether, polyethylene glycol monoallyl ether, polypropylene glycol monoallyl ether, glycerol monoallyl ether, α-hydroxyacrylic acid, N-methylol(meth)acrylamide, glycerol mono(meth)acrylate, vinyl alcohol, and α-hydroxyalkyl acrylates; cationic monomers, such as dimethylaminoethyl (meth)acrylate and dimethylaminopropyl(meth)acrylamide; nitrile monomers, such as (meth)acrylonitrile; phosphorus-containing monomers, such as (meth)acrylamidomethane phosphonic acid, methyl (meth)acrylamidomethanephosphonate, and 2-(meth)acrylamido-2-methylpropanephosphonic acid; alkyl vinyl ethers, such as methyl vinyl ether and ethyl vinyl ether; and vinylpyrrolidone. These monomers may be used either alone respectively or in combinations with each other.

The polymerization initiator is not especially limited, but examples thereof include: hydrogen peroxide; persulfuric acid salts, such as ammonium persulfate, sodium persulfate and potassium persulfate; azo compounds, such as 2,2'-azobis(2-amidinopropane) dihydrochloride, 4,4'-azobis-(4-cyanovaleric acid), 2,2'-azobisisobutyronitrile and 2,2'-azobis(4-methoxy-2,4-dimethylvaleronitrile); organic peroxides, such as benzoyl peroxide, lauroyl peroxide, peracetic acid, persuccinic acid, di-tertiary-butyl peroxide, di-tertiary-butyl hydroperoxide and cumene hydroperoxide. These may be used either alone respectively or in combinations with each other. Among them, the use of hydrogen peroxide or persulfuric acid salt is preferable, and the joint use of hydrogen peroxide and persulfuric acid salt is more preferable.

In the case where hydrogen peroxide is used as the polymerization initiator, it is preferable to finish charging hydrogen peroxide earlier than the charging end of all the monomers, more preferably, by 10 minutes or more, considering the simplification of production facilities, the cost saving, and effects of lessening the amount of hydrogen peroxide remaining at the end of the polymerization. In other words, it is preferable to finish charging hydrogen peroxide in a state where polymerizable raw monomers still remain in the reaction system.

The amount of the polymerization initiator, as used, is not especially limited, but is, for example, preferably in the range of 1~20 wt %, more preferably 3~15 wt %, still more preferably 5~12 wt %, of the total weight of the monomers as used. In the case where the amount of the polymerization initiator, as used, is smaller than 1 wt %, maleic acid tends not to efficiently be introduced into the resultant copolymer (or its salt). In the case where the amount exceeds 20 wt %, the resultant magnesium ion scavengeability tends to be low because of low molecular weight of the resultant copolymer (or its salt).

As to the polymerization solvent, aqueous solvents are used. Particularly preferably, water is used alone. However, a hydrophilic organic solvent may be used by fitly adding it to water, if necessary.

The above hydrophilic organic solvent is not especially limited, but examples thereof include: lower alcohols, such as methanol and ethanol; amides, such as dimethylformamide; and ethers, such as diethyl ether. These may be used either alone respectively or in combinations with each other.

The ratio of the hydrophilic organic solvent, as used, is preferably 20 wt % or less, more preferably 10 wt % or less, still more preferably 1 wt % or less, of the total amount of a mixed solvent with water. In the case where this ratio exceeds 20 wt %, maleic acid has a tendency not to efficiently be introduced into the resultant copolymer (or its salt).

The polymerization temperature is not especially limited, but is preferably 80° C. or higher, more preferably 100° C. or higher or a temperature near the boiling point of the polymerization solvent, for example, in view of efficient introduction of maleic acid into the resultant copolymer (or its salt).

The polymerization pressure is not especially limited, but any of normal pressure (atmospheric pressure), an increased pressure, and a reduced pressure is available.

The neutralization degree of the resultant acrylic acid-maleic acid copolymer (or its salt) is set to be usually in the range of 50~70 mol %, preferably 52~68 mol %, more preferably 55~65 mol %, at the end of the polymerization. In the case where this neutralization degree is less than 50 mol %, maleic acid is introduced into the resultant copolymer (or its salt) in the block form, resulting in the deterioration of the clay dispersibility in the presence of magnesium ion. In the case where the above neutralization degree exceeds 70 mol %, the ratio of maleic acid as introduced is so low that the resultant magnesium ion scavengeability is low, and that the amount of residual maleic acid is large.

The neutralization degree of the resultant acrylic acid-maleic acid copolymer (or its salt) is in the above specific range at the end of the polymerization, but, after the end of the polymerization, the neutralization degree may be changed to any value by conventional methods, if necessary.

The solid component concentration of the resultant acrylic acid-maleic acid copolymer (or its salt) is set to be preferably 45 wt % or higher, more preferably 48 wt % or higher, still more preferably 49 wt % or higher, yet still more preferably 50 wt % or higher, of the entirety of the reaction liquid at the end of the polymerization. In the case where this solid component concentration is lower than 45 wt %, the resultant magnesium ion scavengeability tends to be low because of low molecular weight of the resultant copolymer (or its salt).

The acrylic acid-maleic acid copolymer (or its salt), according to the present invention, can favorably be used, for example, for detergent compositions, detergent builders, water-treating agents (e.g. scale inhibitors for industries, scale inhibitors for oil fields, and scale inhibitors for pulp digesters), pigment dispersants, fiber-treating agents (e.g. bleaching assistants, fiber-scouring assistants, and dyeing assistants), and soil dispersants (e.g. adjusting agents for bentonite muddy water, ground-improving dispersants for high pressure jet processing methods). Hereinafter, explanations are specifically made on detergent compositions, detergent builders, water-treating agents, pigment dispersants, and fiber-treating agents as particularly preferable uses, as selected from among the above various uses, of the present invention acrylic acid-maleic acid copolymer (or its salt).

(Detergent composition):

The detergent composition, according to the present invention, comprises the present invention acrylic acid-maleic acid copolymer (or its salt) and a surfactant.

In the detergent composition of the present invention, the ratio of the present invention acrylic acid-maleic acid copolymer (or its salt) and the surfactant as mixed is not especially limited. However, for example, in view of scavenging the magnesium ion from tap water, dispersing the clay, and preventing the deposition of magnesium hydroxide scale, the ratio to the entirety of the detergent composition is preferably such that: the present invention acrylic acid-maleic acid copolymer (or its salt) is in the range of 1~20 wt %, and the surfactant is in the range of 5~60 wt %, and more preferably, the present invention acrylic acid-maleic acid copolymer (or its salt) is in the range of 2~18 wt %, and the surfactant is in the range of 10~55 wt %.

In addition, the present invention detergent composition may comprise the present invention acrylic acid-maleic acid copolymer (or its salt) and the surfactant, or may further comprise acrylic acid-maleic acid copolymers (or their salts) other than the present invention acrylic acid-maleic acid copolymer (or its salt), or yet other polymers or copolymers (or their salts), for specific example, conventional polymer builders such as glyoxylic acid polymers (or their salts) and polyaspartic acid polymers (or their salts), if they do not hinder the performance or effects of the present invention detergent composition.

As to the surfactant, at least one member selected from the group consisting of anionic surfactants, nonionic surfactants, amphoteric surfactants and cationic surfactants can preferably be used.

The anionic surfactant is not especially limited, but examples thereof include alkylbenzenesulfonic acid salts, alkyl or alkenyl ether sulfuric acid salts, alkyl or alkenyl sulfuric acid salts, α-olefinsulfonic acid salts, α-sulfofatty acids or any ester salt thereof, alkanesulfonic acid salts, saturated or unsaturated fatty acid salts, alkyl or alkenyl ether carboxylic acid salts, amino acid surfactants, N-acylamino acid surfactants, and alkyl or alkenyl phosphoric acid esters or any salt thereof. One or more kinds can be fitly selected from among these surfactants and used.

The nonionic surfactant is not especially limited, but examples thereof include polyoxyalkylene alkyl ethers, polyoxyalkylene alkenyl ethers, polyoxyethylene alkyl phenyl ethers, higher fatty acid alkanolamide or any alkylene oxide addition product thereof, sucrose fatty acid esters, alkyl glycoxides, fatty acid glycerol monoesters, and alkylamine oxides. One or more kinds can be fitly selected from among these surfactants and used.

The amphoteric surfactant is not especially limited, but, for example, one or more of carboxy or sulfobetaine amphoteric surfactants are usable.

The cationic surfactant is not especially limited, but, for example, one or more of quaternary ammonium salts are usable.

The detergent composition of the present invention may further comprise an enzyme in order to enhance the detergency, if necessary.

The enzyme, as can be mixed, is not especially limited, but examples of usable enzymes include protease, lipase, and cellulase. Particularly preferred are protease, alkaline lipase, and alkaline cellulase, all of which are highly active in alkaline washing liquids. The amount of the enzyme, as mixed, is preferably within the range of 0.01 to 1 wt % of the entirety of the detergent composition. In the case where the amount deviates from this range, the balance with the surfactant is lost, so the enhancement of the detergency tends to be impossible.

The detergent composition of the present invention, if necessary, may further comprise components which are usually used for conventional detergent compositions, such as alkaline builders, chelate builders, re-attachment inhibitors, fluorescent agents, bleachers and perfumes. In addition, zeolite may also be added. The addition of zeolite is preferable for greatly enhancing the detergency. Examples of usable alkaline builders include silicic acid salts, carbonic acid salts, and sulfuric acid salts. Examples of the chelate builder, as can be used if necessary, include HIDS (hydroxyiminodisuccinic acid salts), IDS (iminodisuccinic acid salts), CMOS (carboxymethyloxysuccinates), diglycolic acid, oxycarboxylic acid salts, EDTA (ethylenediaminetetraacetic acid), DTPA (diethylenetriaminehexaacetic acid), citric acid, and ss-EDDS (ss-ethylenediaminesuccinates). In addition, substances, such as products by addition reaction of EO (ethylene oxide) to polyethylenimine, may further be used as soil releasing agents in order to enhance the detergency.

The detergent composition of the present invention is favorably used as a detergent for clothes. Particularly, this composition, having high scavengeability upon metal ions including magnesium ion, is very effective for inhibiting the yellowing due to a slight amount of metals, which are present in washing liquids, such as iron ions and zinc ions.

Because the detergent composition of the present invention contains the present invention acrylic acid-maleic acid copolymer (or its salt) which has excellent clay dispersibility in the presence of magnesium ion and excellent magnesium ion scavengeability, this detergent composition is well balanced between (1) an effect to disperse mud dirt and (2) an effect to remove oil dirt by inhibiting the insolubilization of the surfactant in the detergent composition by scavenging metal ions, including magnesium ion, even if the magnesium ion is present in water as used for washing. Thus, the detergent composition of the present invention is a high performance detergent composition.

(Detergent builder):

The detergent builder, according to the present invention, comprises the present invention acrylic acid-maleic acid copolymer (or its salt).

The detergent builder of the present invention may comprise the present invention acrylic acid-maleic acid copolymer (or its salt), or may comprise the joint use of this acrylic acid-maleic acid copolymer (or its salt) with conventional detergent builders, such as alkaline builders, chelate builders, glyoxylic acid polymers (or their salts), and polyaspartic acid polymers (or their salts), or with other polymers (or their salts). The amount of these materials, jointly usable with the present invention acrylic acid-maleic acid copolymer (or its salt), is not especially limited if those materials do not hinder the performance or effects of the present invention detergent builder. The content of the present invention acrylic acid-maleic acid copolymer (or its salt) in the present invention detergent builder is preferably in the range of 1~100 wt %, more preferably 5~100 wt %, of the entirety of the detergent builder. Specific examples of the alkaline builder and the chelate builder include the same as exemplified above as those which can be added to the detergent composition of the present invention.

(Water-treating agent):

The water-treating agent, comprising the present invention acrylic acid-maleic acid copolymer (or its salt), is excellent in dispersibility and other performances, such as chelating ability and scale inhibitability, even in regions where the magnesium ion content in water is high. Therefore, this water-treating agent is useful for inhibiting the formation of magnesium hydroxide scale and calcium carbonate scale in systems such as cooling water circulation systems, boiler water circulation systems, seawater desalination plants, pulp digesters, and black liquor evaporators. Not only may the acrylic acid-maleic acid copolymer (or its salt) be used alone as the water-treating agent, but it may be used as the water-treating agent in the form of a composition which further comprises additives such as polymeric phosphoric acid salts, phosphonic acid salts, anticorrosive agents, slime controlling agents, and chelating agents. In addition, the water-treating agent may further comprise polymers (or their salts) other than the present invention acrylic acid-maleic acid copolymer (or its salt) if they do not hinder the performance or effects of the water-treating agent.

In the water-treating agent comprising the present invention acrylic acid-maleic acid copolymer (or its salt), the content of this copolymer (or its salt) is preferably in the range of 5~100 wt %, more preferably 10~99 wt %, most preferably 20~80 wt %, of the solid content of the water-treating agent.

The amount of the water-treating agent, which comprises the present invention acrylic acid-maleic acid copolymer (or its salt) and is added to the water system, is not especially limited, but is preferably in the range of 0.1~100 ppm, more preferably 0.5~50 ppm, most preferably 1~20 ppm, in the water system.

(Pigment dispersant):

The pigment dispersant, comprising the present invention acrylic acid-maleic acid copolymer (or its salt), is excellent in pigment dispersibility even in regions where the magnesium ion content in water is high. Therefore, this pigment dispersant exhibits good performance as a dispersant for pigments, for example, inorganic pigments, such as heavy or light calcium carbonate (as used for paper coating), clay, titanium oxide, magnesium hydroxide, iron oxide, and alumina, and organic pigments, such as carbon black and phthalocyanine.

The above pigment dispersant may comprise the present invention acrylic acid-maleic acid copolymer (or its salt), but may further comprise other components such as polymeric phosphoric acid and any salt thereof, phosphonic acid and any salt thereof, and polyvinyl alcohol, or may further comprise polymers (or their salts) other than the present invention acrylic acid-maleic acid copolymer (or its salt) if they do not hinder the performance or effects of the pigment dispersant.

If a small amount of the pigment dispersant comprising the present invention acrylic acid-maleic acid copolymer (or its salt) is added to a pigment instead of conventional pigment dispersants and dispersed into water along with the pigment, then high concentration pigment slurries such as high concentration calcium carbonate slurries can be produced wherein the high concentration pigment slurries have a low viscosity and a high fluidity, and further, a good stability of these properties over a period of time.

The amount of the pigment dispersant, as used, comprising the present invention acrylic acid-maleic acid copolymer (or its salt), is preferably in the range of 0.05~2 wt %, more preferably 0.1~1.0 wt %, still more preferably 0.2~0.8 wt %, in terms of the ratio of the present invention acrylic acid-maleic acid copolymer (or its salt) to the pigment. In the case where the amount of the pigment dispersant, as used, is smaller than 0.05 wt %, the dispersibility tends to be insufficient. In the case where the amount exceeds 2 wt %, effects rewarding the increase in the amount of addition tends to be unexpectable.

(Fiber-treating agent):

Even in regions where the magnesium ion content in water is high, the fiber-treating agent comprising the present invention acrylic acid-maleic acid copolymer (or its salt) exhibits high dispersibility and high effects of improving the detergency, and further, can prevent the magnesium hydroxide scale from being deposited to fibers and thus deteriorating their hygroscopicity and touch. Therefore, this fiber-treating agent can favorably be used in the steps, such as scouring, dyeing, bleaching, and soaping steps, in the treatment of fibers.

The acrylic acid-maleic acid copolymer (or its salt) may be used alone as the fiber-treating agent, but also can be used in the form of a composition further comprising additives such as dyeing agents, peroxides, and surfactants. As to the above additive, those which are usually used for conventional fiber-treating agents are available. The ratio between the acrylic acid-maleic acid copolymer (or its salt) and the above additive is such that the above additive is added in the ratio of preferably 0.1~100 weight parts, more preferably 0.2~80 weight parts, still more preferably 1~50 weight parts, per 1 weight part of the acrylic acid-maleic acid copolymer (or its salt), for example, in order to improve the degree of whiteness, color evenness and degree of dyed colorfastness of fibers. In the case where the amount of the above additive is smaller than 0.1 weight part, the effect due to the addition tends to be insufficient. In the case where the amount exceeds 100 weight parts, the acrylic acid-maleic acid copolymer (or its salt) tends to be unable to exhibit their effects. The fiber-treating agent, comprising the present invention acrylic acid-maleic acid copolymer (or its salt), may further comprise acrylic acid-maleic acid copolymers (or their salts) other than the present invention acrylic acid-maleic acid copolymer (or its salt) if they do not hinder the performance or effects of the fiber-treating agent. The content of the present invention acrylic acid-maleic acid copolymer (or its salt) in the fiber-treating agent is not especially limited, but is preferably in the range of 1~100 wt %, more preferably 5~100 wt %, of the entirety of the fiber-treating agent.

The fiber for which the fiber-treating agent comprising the present invention acrylic acid-maleic acid copolymer (or its salt) can be used is not especially limited. However, examples thereof include cellulose fibers, such as cotton and hemp; chemical fibers, such as nylon and polyester; animal fibers, such as wool and silk; semisynthetic fibers, such as rayon; and any fabric and blend thereof.

In the case where the fiber-treating agent comprising the present invention acrylic acid-maleic acid copolymer (or its salt) is applied to the scouring step, it is preferable that the present invention acrylic acid-maleic acid copolymer (or its salt) is mixed with alkali agents and surfactants. For the bleaching step, it is preferable that the present invention acrylic acid-maleic acid copolymer (or its salt) is mixed with peroxides and with silicic chemicals, which are used as inhibitors of alkaline bleachers from decomposition, such as sodium silicate.

Part II

In this part II, detailed descriptions are given on the present invention production process for the aqueous maleic salt solution and on the present invention maleic acid copolymer (or its salt) resultant from this aqueous solution.

First of all, the production process for the aqueous maleic salt solution, according to the present invention, comprises the steps of: charging 80% or less of the required amount of a basic substance to produce the aqueous maleic salt solution and 80% or less of the required amount of maleic acid (or its salt) and/or maleic anhydride to produce the aqueous maleic salt solution into a reaction vessel; and then adding thereto the respective balances of water, the basic substance, and the maleic acid (or its salt) and/or maleic anhydride under conditions where the highest value of the reaction temperature will be 80° C. or higher; thus obtaining the aqueous maleic salt solution with a formed malic acid content of not more than 10,000 ppm, therefore, with high purity.

Examples of the basic substance, as initially charged, include: alkaline metal hydroxides, such as sodium hydroxide and potassium hydroxide; alkaline earth metal hydroxides, such as calcium hydroxide and magnesium hydroxide; and ammonia water. These may be used either alone respectively or in combinations with each other.

Preferable ones are alkaline metal salts, and the most preferable one is sodium hydroxide.

As to the basic substance, 80% or less, preferably 60% or less, most preferably 50% or less, of the required amount thereof to produce the aqueous maleic salt solution is initially charged into the reaction vessel. In the case where more than 80% of the required amount is initially charged, a large amount of malic acid is unfavorably formed.

In addition, the maleic acid (or its salt) and/or maleic anhydride, as initially charged, may be in any form of melted products of maleic anhydride, solids (e.g. powders or tablets) of maleic anhydride, melted products of maleic acid (so-called hydrous maleic acid), solids (e.g. powders or tablets) of maleic acid (the same as above), and aqueous solutions of maleic acid (either of anhydrous and hydrous ones). These may be used either alone respectively or in combinations with each other. Particularly, the melted products of maleic anhydride are preferable.

As to the maleic acid, 80% or less, preferably 60% or less, most preferably 50% or less, of the required amount thereof to produce the aqueous maleic salt solution is initially charged into the reaction vessel. In the case where more than 80% of the required amount is initially charged, there are disadvantages in that the amount of fumaric acid being formed greatly increases. The fumaric acid is an isomer of maleic acid and consumed in the polymerization, but fumaric acid has the disadvantage of having much lower polymerizability than maleic acid, therefore making it very difficult to control the molecular weight and the molecular weight distribution, and increasing the amount of residual monomers.

Next, after initially charging the above materials under the above conditions, the respective balances of water, the basic substance, and the maleic acid (or its salt) and/or maleic anhydride are added, when the highest value of the reaction temperature needs to be 80° C. or higher, and is preferably 100° C. or higher, and is most preferably so high as to produce a boiling point reflux state. In the case where the reaction temperature is below 80° C., the neutralization will unfavorably need a very long time.

In addition, the molar ratio of the maleic acid (or its salt) and/or maleic anhydride to the basic substance in the reaction system is preferably maintained in the range of 1:4~4:1 for 90% or more of a period of time when the reaction temperature is 100° C. or higher. This ratio is more preferably maintained in the range of 1:3~3:1, and most preferably in the range of 1:2~2:1. Especially, when the reaction temperature is 110° C. or higher, the above ratio is preferably maintained in the range of 1:3~3:1, and more preferably in the range of 1:2~2:1. In the case where the molar ratio of the basic substance is more than the above ranges, there are disadvantages in that the amount of malic acid being formed greatly increases. In the case where the molar ratio of the maleic acid (or its salt) and/or maleic anhydride is more than the above ranges, the amount of fumaric acid being formed greatly increases, so there are disadvantages for the aforementioned reason.

Furthermore, the aqueous maleic salt solution, as produced by the initial charging and the dropping, has a solid component concentration of preferably 40 wt % or higher, more preferably 45 wt % or higher, most preferably 50 wt % or higher, at the end of the reaction. In the case where the solid component concentration of the aqueous maleic salt solution is lower than 40 wt %, there are disadvantages, for example, in that the polymerization using such an aqueous maleic salt solution implies a low solid component concentration in the polymerization and therefore greatly lowers the productivity or greatly deteriorates the polymerizability of maleic acid. In addition, as the solid component concentration becomes higher, the productivity preferably becomes better. However, in the case where the solid component concentration exceeds 75 wt %, there are disadvantages in that the water solubility and the stability of the resultant aqueous maleic salt solution are deteriorated.

In the above way, the aqueous maleic salt solution with a formed malic acid content of not more than 10,000 ppm, therefore, with high purity can be obtained. Incidentally, the reason why malic acid is chosen as the impurity is because malic acid is a product by addition reaction of water to maleic acid, and is presumed to be easily formed as a by-product, namely, an impurity, during the neutralization, and is actually formed in the largest quantity among the impurities. The malic acid content in this aqueous maleic salt solution of high purity is preferably not more than 7,000 ppm, more preferably not more than 5,000 ppm, still more preferably not more than 4,000 ppm, most preferably not more than 2,000 ppm.

Next, explanations are made on the maleic acid copolymer (or its salt) as obtained from this aqueous maleic salt solution of high purity. However, the use of the present invention aqueous maleic salt solution is not limited thereto.

The maleic acid copolymer (or its salt), according to the present invention, is a maleic acid/acrylic acid copolymer (or its salt), which comprises maleic acid (or its salt) of 30~70 mol % and acrylic acid (or its salt) of 70~30 mol %, and has a weight-average molecular weight of 2,000~50,000, a calcium ion scavengeability of 400 mg $CaCO_3$/g or more, a clay dispersibility of 0.6 or more, and a malic acid content of not more than 9 wt % in the solid content of the copolymer (or its salt).

The calcium ion scavengeability is defined as the mg number, in terms of calcium carbonate, of calcium ion as scavenged by 1 g of copolymer (or its salt), and is an index to show how much calcium ion in water the maleic acid scavenges. The surfactant becomes insoluble upon bonding to calcium ion in water. However, if the maleic acid copolymer (or its salt) having high calcium ion scavengeability is used together with the surfactant, then the surfactant is prevented from becoming insoluble, so that a great effect upon improving the detergency is produced. The calcium ion scavengeability of the present invention copolymer (or its salt) is 400 mg $CaCO_3$/g or more, and preferably 420 mg $CaCO_3$/g or more. The increase in the calcium ion scavengeability has the advantage of enhancing the ability of the maleic acid copolymer (or its salt) as the detergent builder. However, an attempt to obtain a copolymer (or its salt) having a calcium ion scavengeability more than 490 mg $CaCO_3$/g might lower the production efficiency or involve high cost.

The clay dispersibility is an index for evaluation of effects upon removing and uniformly dispersing the dirt such as mud dirt, thereby preventing the clay from precipitating, in the course of washing. To sufficiently obtain such effects, the clay dispersibility of the present invention copolymer (or its salt) is 0.6 or more, and preferably 0.8 or more. The increase in the clay dispersibility has the advantage of enhancing the ability of the maleic acid copolymer (or its salt) as the detergent builder. However, an attempt to obtain a copolymer (or its salt) having a clay dispersibility more than 1.5 might lower the production efficiency or involve high cost.

The malic acid content in the solid content of the copolymer (or its salt) is an index to show how large amount of low-molecular impurity is contained in the maleic acid copolymer (or its salt). Incidentally, the reason why malic acid is chosen as the impurity is not only such as aforementioned about the neutralization step, but also that maleic acid is polymerized in the aqueous solution, and further that, especially in the case where hydrogen peroxide is used as the polymerization initiator, malic acid is presumed to be easily formed, and is actually formed in the largest quantity among the impurities. The ratio of the malic acid content to the solid content of the present invention copolymer (or its salt) is not more than 9 wt %, and preferably not more than 7 wt %, more preferably not more than 5 wt %. The decrease in the malic acid content has the advantage of enhancing the ability of the maleic acid copolymer (or its salt) as the detergent builder. However, in the case where hydrogen peroxide is used as the polymerization initiator under the below-mentioned conditions, an attempt to obtain a copolymer (or its salt) having a malic acid content of not more than 3 wt % might lower the production efficiency or involve high cost.

In addition, the monomer components of the present invention maleic acid copolymer (or its salt) comprises maleic acid (or its salt) of 30~70 mol % and acrylic acid (or its salt) of 70~30 mol %, and, if necessary, can further comprise another water-soluble monoethylenic monomer of 5 mol % or less.

As to the maleic acid (or its salt), the aforementioned aqueous maleic salt solution is preferably used, and, according to cases, maleic acid and/or maleic anhydride may further be used fitly. In the case where the ratio of the maleic acid (or its salt) is less than 30 mol %, there are disadvantages in that the copolymer (or its salt) having high calcium ion scavengeability is extremely difficult to obtain. In addition, in the case where the ratio of the maleic acid (or its salt) exceeds 70 mol %, there are disadvantages in that the polymerizability tends to greatly be deteriorated, and further that the resultant copolymer (or its salt) tends to have a greatly deteriorated clay dispersibility.

As to the acrylic acid (or its salt), either of acrylic acid and acrylic salt may be used, and any mixture thereof is also available. The acrylic salt is obtainable by neutralization with the aforementioned basic substance. In the case where the ratio of the acrylic acid (or its salt) is less than 30 mol %, there are disadvantages in that the polymerizability tends to greatly be deteriorated, and further that the resultant copolymer (or its salt) tends to have a greatly deteriorated clay dispersibility. In addition, in the case where the ratio of the acrylic acid (or its salt) exceeds 70 mol %, there are disadvantages in that the copolymer (or its salt) having high calcium ion scavengeability is extremely difficult to obtain.

Examples of the above other water-soluble monoethylenic monomer, as used in the amount of 5 mol % or less if necessary, include unsaturated monocarboxylic acid monomers, such as methacrylic acid, α-hydroxyacrylic acid and crotonic acid, and any salt thereof; unsaturated polycarboxylic acid monomers, such as fumaric acid, itaconic acid, citraconic acid and aconitic acid, and any salt thereof; vinyl acetate; hydroxyl-group-containing unsaturated monomers, such as 3-methyl-3-buten-1-ol (isoprenol), 3-methyl-2-buten-1-ol (prenol), 2-methyl-3-buten-2-ol (isoprene alcohol), and monomers as formed from addition reactions of 1~100 mol of ethylene oxide and/or propylene oxide to 1 mol of the above monomers; (meth)allyl etheric unsaturated monomers, such as glycerol monoallyl ether and monomers as formed from addition reactions of 1~100 mol of ethylene oxide and/or propylene oxide to 1 mol of glycerol monoallyl ether; sulfonic-acid-group-containing unsaturated monomers, such as 3-allyloxy-2-hydroxypropanesulfonic acid, vinylsulfonic acid, allylsulfonic acid, methallylsulfonic acid, styrenesulfonic acid, 2-acrylamido-2-methylpropanesulfonic acid, sulfoethyl (meth)acrylate, sulfopropyl (meth)acrylate, 2-hydroxysulfopropyl (meth)acrylate and sulfoethylmaleimide, and any salt thereof; terminal-alkyl-group-containing esteric unsaturated monomers, such as (i) monoesters, as formed from reactions of alcohols with unsaturated monocarboxylic acid monomers (e.g. (meth) acrylic acid and crotonic acid), or (ii) monoesters, any salt thereof, or diesters, as formed from reactions of alcohols with unsaturated polycarboxylic acid monomers (e.g. maleic acid, fumaric acid, itaconic acid, citraconic acid, and aconitic acid), wherein the alcohols are products from addition reactions of 0~100 mol of ethylene oxide and/or propylene oxide to alkyl alcohols having 1~20 carbon atoms; esteric unsaturated monomers, such as (iii) monoesteric monomers, as formed from addition reactions of 1~100 mol of ethylene oxide and/or propylene oxide to 1 mol of unsaturated carboxylic acid monomers (e.g. (meth)acrylic acid and crotonic acid), or (iv) monoesters, any salt thereof, or diesteric monomers, as formed from addition reactions of 1~100 mol of ethylene oxide and/or propylene oxide to 1 mol of unsaturated polycarboxylic acid monomers (e.g. maleic acid, fumaric acid, itaconic acid, citraconic acid, and aconitic acid).

Furthermore, the weight-average molecular weight of the present invention copolymer (or its salt) is in the range of 2,000~50,000, preferably, 5,000~15,000. In the case where the weight-average molecular weight is less than 2,000, there are disadvantages in that the calcium ion scavengeability is greatly deteriorated. In the case where the weight-average molecular weight exceeds 50,000, there are disadvantages in that the clay dispersibility is greatly deteriorated.

Next, explanations are made on the present invention production process for the maleic acid copolymer (or its salt). The present invention copolymer (or its salt) is obtainable by any production process, but, particularly preferably, produced by the below-mentioned process.

As to the maleic acid (or its salt), preferably 50 wt % or more, more preferably 70 wt % or more, most preferably the entirety, of the amount thereof as used is charged into the reaction vessel prior to the reaction. In the case where the charging amount prior to the reaction is smaller than 50 wt %, there are disadvantages in that a large amount of maleic acid (or its salt) might remain after the end of the polymerization. In addition, the concentration of the maleic acid (or its salt) at the initiation of the polymerization is usually 40 wt % or more, preferably 45 wt % or more, more preferably 50 wt % or more. In the case where the charging concentration is smaller than 40 wt %, there are disadvantages in that a large amount of maleic acid (or its salt) might remain after the end of the polymerization.

As to the acrylic acid (or its salt), preferably 50 wt % or more, more preferably 70 wt % or more, most preferably the entirety, of the amount thereof as used is dropwise supplied into the reaction vessel after the initiation of the polymerization. In the case where the amount exceeding 50 wt % is charged prior to the reaction, there are disadvantages in that, because acrylic acid (or its salt) has much higher polymerizability than maleic acid, it is remarkably difficult to control the molecular weight and the molecular weight distribution. The dropping period of time is in the range of usually 30~300 minutes, preferably 60~180 minutes, after the initiation of the reaction. Such a dropping period of time has the advantage of narrowing the molecular weight distribution of the resultant maleic acid copolymer (or its salt) and therefore enhancing the calcium ion scavengeability and the clay dispersibility. Also for enhancing the productivity, it is preferable to finish dropping the acrylic acid (or its salt) in a short period of time. However, dropping shorter than 30 minutes has the disadvantage of involving a large amount of residual maleic acid after the end of the polymerization, or having a possibility that much reaction heat might be generated in a short period of time to make it difficult to remove the heat. In addition, dropping longer than 300 minutes is unfavorable, because it greatly deteriorates the productivity and is therefore economically disadvantageous.

In addition, as to the aforementioned other water-soluble monoethylenic monomer, the initially charging amount and the dropping amount thereof may be determined optionally according to the polymerizability thereof. The dropping period of time is also optional, but it is preferable that the dropping end is earlier than that of acrylic acid (or its salt).

As to the polymerization solvent, aqueous solvents are used. Preferably 80 wt % or more, most preferably 100 wt %, thereof is water. Examples of hydrophilic organic solvents, usable jointly with water as the aqueous solvent, include: lower alcohols, such as methanol, ethanol, and isopropyl alcohol; amides, such as diethylformamide; and ethers, such as diethyl ether. These may be used either alone respectively or in combinations with each other.

In the present invention, hydrogen peroxide is preferably used as a water-soluble polymerization initiator. The amount of hydrogen peroxide, as used, is preferably within the range of 2~8 g, more preferably 3~5 g, per mol of the monomer components. In the case where the amount of hydrogen peroxide, as used, is smaller than 2 g, there are disadvantages in that a large amount of maleic acid remains, and that the molecular weight of the resulting copolymer (or its salt) is too high, thus resulting in low clay dispersibility. In addition, in the case where more than 9 g of hydrogen peroxide is used, there are disadvantages in that the amount of residual hydrogen peroxide is too large at the end of the polymerization.

Considering the simplification of production facilities, the cost saving, and effects of lessening the amount of hydrogen peroxide remaining at the end of the polymerization, it is preferable to finish dropping hydrogen peroxide earlier than the dropping end of acrylic acid (or its salt) by 20 minutes or more. The above production conditions can reduce the concentration of hydrogen peroxide, remaining after the end of the polymerization, to 2 wt % or lower, more preferably 1 wt % or lower, still more preferably 0.5 wt % or lower, of the entirety of the reaction liquid. In addition, the production conditions can reduce the amount of maleic acid, remaining after the end of the polymerization, to 3 wt % or smaller, more preferably 1 wt % or smaller, of the entirety of the reaction liquid. In the case where the amount of residual maleic acid is larger than 3 wt %, unfavorably, there might be problems in that crystals of maleic acid are deposited in places where it is cold in winter.

In the present invention production process, other water-soluble polymerization initiators may further be used, if necessary. Examples thereof include: persulfuric acid salts, such as ammonium persulfate, sodium persulfate and potassium persulfate; azo compounds, such as 2,2'-azobis(2-a midinopropane) dihydrochloride, 4,4'-azobis-(4-cyanovaleric acid), 2,2'-azobisisobutyronitrile and 2,2'-azobis(4-methoxy-2,4-dimethylvaleronitrile); organic peroxides, such as benzoyl peroxide, lauroyl peroxide, peracetic acid, persuccinic acid, di-tertiary-butyl peroxide, di-tertiary-butyl hydroperoxide and cumene hydroperoxide. It is also permissible to use any mixture of at least two members selected from the group consisting of these compounds. Particularly preferred ones are the persulfuric acid salts such as ammonium persulfate, sodium persulfate and potassium persulfate. Incidentally, the entirety of the water-soluble polymerization initiator is, preferably, dropwise supplied into the reaction vessel. The beginning and ending times of the dropping are optional, but, preferably, the dropping end of the water-soluble polymerization initiator is 10~20 minutes later than that of acrylic acid (or its salt). If so, the amount of residual acrylic acid can be reduced very much.

In addition, if necessary, polyvalent metals are usable to raise the efficiency of the above initiator. Examples of usable effective polyvalent metal ions include: iron ions, vanadium-atom-containing ions, and copper ions. Among the polyvalent metal ions, preferable ones are $Fe^{3+}$, $Fe^{2+}$, $Cu^+$, $Cu^{2+}$, $V^{2+}$, $V^{3+}$ and $VO^{2+}$, and more preferable ones are $Fe^{3+}$, $Cu^{2+}$ and $VO^{2+}$. These polyvalent metal ions may be used either alone respectively or in combinations with each other. The concentration of the polyvalent metal ions is preferably in the range of 0.1 to 100 ppm of the entirety of the reaction liquid. In the case where the concentration is lower than 0.1 ppm, few effects are seen. In the case where the concentration is higher than 100 ppm, the resulting maleic acid copolymer (or its salt) is highly colored, and it might therefore be impossible to use such a copolymer (or its salt) as a component of detergent compositions.

The form in which the polyvalent metal ions are supplied is not especially limited, and any metal compound and any metal can be used if it becomes ionized in the polymerization reaction system. Examples of such metal compounds and metals include: water-soluble metal salts, such as vanadium oxytrichloride, vanadium trichloride, vanadium oxalate, vanadium sulfate, vanadic anhydride, ammonium metavanadate, ammonium hypo-vanadious [$(NH_4)_2 SO_4 \cdot VSO_4 \cdot 6H_2O$], ammonium vanadious [$(NH_4)V(SO_4)_2 \cdot 12H_2O$], copper(II) acetate, copper(II) bromide, copper(II) acetylacetate, cupric chloride, ammonium cuprous chloride, copper carbonate, copper(II) chloride, copper(II) citrate, copper(II) formate, copper(II) hydroxide, copper nitrate, copper naphthenate, copper(II) oleate, copper maleate, copper phosphate, copper(II) sulfate, cuprous chloride, copper (I) cyanide, copper iodide, copper(I) oxide, copper thiocyanate, iron acetylacetonate, ammonium iron citrate, ammonium ferric oxalate, ammonium ferrous sulfate, ammonium ferric sulfate, iron citrate, iron fumarate, iron maleate, ferrous lactate, ferric nitrate, iron pentacarbonyl, ferric phosphate and ferric pyrophosphate; metal oxides, such as vanadium pentaoxide, copper(II) oxide, ferrous oxide and ferric oxide; metal sulfides, such as copper(II) sulfide and iron sulfide; and copper powder and iron powder.

The above metal compounds and metals may be charged into the reaction vessel at any time before the end of the reaction, but is preferably charged thereto before the initiation of the reaction.

The pH value during the polymerization reaction can be selected optionally. However, preferably for enhancing the polymerizability of maleic acid, the pH is in the range of 5~13 at the initiation of the polymerization, and is then decreased with the progress of the polymerization. Examples of basic compounds for neutralization, as used to adjust the pH during the polymerization, include: hydroxides and carbonates of alkaline metals such as sodium, potassium and lithium; ammonia; alkylamines such as monomethylamine, diethylamine, trimethylamine, monoethylamine, dimethylamine and triethylamine; alkanolamines such as monoethanolamine, diethanolamine, triethanolamine, isopropanolamine and secondary-butanolamine; and pyridine. It is also permissible to use any mixture of at least two members selected from the group consisting of these compounds.

In the present invention, the monomer component, the polymerization initiator, the aqueous solvent, and other raw materials (usable if necessary), as mentioned above, need to be used in amounts such that the theoretical solid component concentration will be 40 wt % or more after the end of the polymerization. In the case where the theoretical solid component concentration is less than 40 wt %, bad influences are unfavorably produced upon the calcium ion scavengeability and the clay dispersibility, because the resultant molecular weight is low, and because the resultant molecular weight distribution is broad.

As to other polymerization conditions, the polymerization temperature is preferably 80° C. or higher, and more preferably near the boiling point of the polymerization solvent. In the case where the polymerization temperature is lower than 80° C., there are disadvantages in that the amount of residual maleic acid is greatly increased. In addition, the polymerization pressure is not especially limited, but any of normal pressure (atmospheric pressure), an increased pressure, and a reduced pressure is available.

By the above production process, the present invention maleic acid copolymer (or its salt) is obtainable.

Next, explanations are made on uses of the present invention maleic acid copolymer (or its salt). The present invention copolymer (or its salt) is, for example, used for detergent compositions, inorganic-pigment dispersants, water-treating agents, and fiber-treating agents.

The above detergent composition comprises the present invention copolymer (or its salt) and a surfactant. In the detergent composition, the concentration of the copolymer (or its salt) is preferably within the range of 0.1 to 20 wt %, more preferably within the range of 0.5 to 15 wt %, and the concentration of the surfactant is preferably within the range of 5 to 70 wt %, more preferably within the range of 20 to 60 wt %.

As to the surfactant, any of anionic surfactants, nonionic surfactants, amphoteric surfactants and cationic surfactants is usable.

Examples of the anionic surfactant include alkylbenzenesulfonic acid salts, alkyl or alkenyl ether sulfuric acid salts, alkyl or alkenyl sulfuric acid salts, α-olefinsulfonic acid salts, α-sulfofatty acids or any ester salt thereof, alkanesulfonic acid salts, saturated or unsaturated fatty acid salts, alkyl or alkenyl ether carboxylic acid salts, amino acid surfactants, N-acylamino acid surfactants, and alkyl or alkenyl phosphoric acid esters or any salt thereof.

Examples of the nonionic surfactant include polyoxyalkylene alkyl ethers, polyoxyalkylene alkenyl ethers, polyoxyethylene alkyl phenyl ethers, higher fatty acid alkanolamide or any alkylene oxide addition product thereof, sucrose fatty acid esters, alkyl glycoxides, fatty acid glycerol monoesters, and alkylamine oxides.

Examples of the amphoteric surfactant include carboxy or sulfobetaine amphoteric surfactants.

Examples of the cationic surfactant include quaternary ammonium salts.

The detergent composition containing the present invention copolymer (or its salt) may further comprise an enzyme, if necessary. Examples of the enzyme, as can be mixed, include protease, lipase, and cellulase. Particularly preferred are protease, alkaline lipase, and alkaline cellulase, all of which are highly active in alkaline washing liquids. The amount of the enzyme, as mixed, is preferably within the range of 0.01 to 5 wt % of the entirety of the detergent composition. In the case where the amount deviates from this range, the balance with the surfactant is lost, so the enhancement of the detergency is impossible. If necessary, the detergent composition containing the present invention copolymer (or its salt) may further comprise components which are usually used for conventional detergent compositions, such as alkaline builders, chelate builders, re-attachment inhibitors, fluorescent agents, bleachers and perfumes. In addition, zeolite may also be added. Examples of usable alkaline builders include silicic acid salts, carbonic acid salts, and sulfuric acid salts. Examples of the chelate builder, as can be used if necessary, include diglycolic acid, oxycarboxylic acid salts, EDTA (ethylenediaminetetraacetic acid), DTPA (diethylenetriaminehexaacetic acid), and citric acid.

The above inorganic-pigment dispersant may comprise the present invention copolymer (or its salt) only, or may further comprise other components such as polymeric phosphoric acid and any salt thereof, phosphonic acid and any salt thereof, and polyvinyl alcohol. In either case, the inorganic-pigment dispersant exhibits good performance as a dispersant for inorganic pigments, such as heavy or light calcium carbonate (as used for paper coating) and clay. If a small amount of the inorganic-pigment dispersant comprising the present invention copolymer (or its salt) is added to an inorganic pigment and dispersed into water along with the pigment, then high concentration inorganic pigment slurries such as high concentration calcium carbonate slurries can be produced wherein the high concentration inorganic pigment slurries have a low viscosity and a high fluidity, and further, a good stability of these properties over a period of time. The amount of the inorganic-pigment dispersant, as used, is preferably within the range of 0.05 to 2.0 weight parts per 100 weight parts of the inorganic pigment.

The copolymer (or its salt) of the present invention may be used alone as the water-treating agent, or may be used as the water-treating agent in the form of a composition which further comprises additives such as polymeric phosphoric acid salts, phosphonic acid salts, anticorrosive agents, slime controlling agents, and chelating agents. Either case is useful for inhibiting the formation of scale in systems such as cooling water circulation systems, boiler water circulation systems, seawater desalination plants, pulp digesters, and black liquor evaporators.

The above fiber-treating agent comprises the present invention copolymer (or its salt) and at least one member selected from the group consisting of dyeing agents, peroxides and surfactants, and can be used in the steps, such as scouring, dyeing, bleaching, and soaping steps, in the treatment of fibers. As to the above dyeing agents, peroxides, and surfactants, those which are usually used for conventional fiber-treating agents are available. The ratio between the copolymer (or its salt) and the at least one member selected from the group consisting of dyeing agents, peroxides and surfactants is such that the at least one member selected from the group consisting of dyeing agents, peroxides and surfactants is added in the ratio of 0.1~100 weight parts per 1 weight part of the copolymer (or its salt), for example, in order to improve the degree of whiteness, color evenness and degree of dyed colorfastness of fibers. The fiber for which the fiber-treating agent can be used is not especially limited. However, examples thereof include cellulose fibers, such as cotton and hemp; chemical fibers, such as nylon and polyester; animal fibers, such as wool and silk; semisynthetic fibers, such as rayon; and any fabric and blend thereof. In the case where the fiber-treating agent is applied to the scouring step, it is preferable that the present invention copolymer (or its salt) is mixed with alkali agents and surfactants. For the bleaching step, it is preferable that the present invention copolymer (or its salt) is mixed with peroxides and with silicic chemicals, which are used as inhibitors of alkaline bleachers from decomposition, such as sodium silicate.

(Effects and Advantages of the Invention):

The acrylic acid-maleic acid copolymer (or its salt) of the present invention does not only maintain conventional performance levels of the metal ion scavengeability, the clay dispersibility, and the scale inhibitability upon calcium ion, but is also at high level in performances with regard to magnesium ion as have never been studied, such as magnesium ion scavengeability, clay dispersibility in the presence of magnesium ion, and scale inhibitability upon magnesium ion. Thus, the acrylic acid-maleic acid copolymer (or its salt) of the present invention is a copolymer (or its salt) which is excellent with good balance in performances, such as metal ion scavengeability, clay dispersibility, calcium carbonate scale inhibitability, and magnesium hydroxide scale inhibitability, even in regions where the magnesium ion content in water is high.

The production process of the present invention can give the above excellent acrylic acid-maleic acid copolymer (or its salt) with ease and good efficiency, therefore, at a low cost, and further, with a small amount of residual monomer at the end of the polymerization, therefore, with high productivity. The reason why the resultant acrylic acid-maleic acid copolymer (or its salt) displays the above excellent performances is considered to be that maleic acid and acrylic acid are introduced into the resultant copolymer (or its salt) at high random. Especially, it is considered that the good performances are displayed because the resultant copolymer (or its salt) merely has a very low proportion of moieties where maleic acid is polymerized in the block form.

Because the present invention detergent composition comprises the above present invention acrylic acid-maleic acid copolymer (or its salt) and because this copolymer (or its salt) has high magnesium ion scavengeability as above, the present invention detergent composition prevents the surfactant from bonding to magnesium ion in water and thus becoming insoluble even in regions where the magnesium ion content in water is high. Therefore, the present invention detergent composition has a great effect upon improving the detergency to oil dirt. In addition, because the present invention acrylic acid-maleic acid copolymer (or its salt), as contained in the present invention detergent composition, is excellent also in the clay dispersibility in the presence of magnesium ion, the present invention detergent composition exhibits high detergency to mud dirt even in regions where the magnesium ion content in water is high. Furthermore, because the present invention acrylic acid-maleic acid copolymer (or its salt), as contained in the present invention detergent composition, is excellent also in the magnesium hydroxide scale inhibitability, the present invention detergent composition can prevent the magnesium hydroxide scale from being deposited to clothes and thus deteriorating their hygroscopicity and touch even in regions where the magnesium ion content in water is high.

Because of comprising the above present invention acrylic acid-maleic acid copolymer (or its salt), the present invention detergent builder is excellent in the dispersibility and the chelating ability, and contributes to the enhancement of the detergency of detergents, even in regions where the magnesium ion content in water is high.

The present invention further can provide a production process for an aqueous maleic salt solution which contains only a small amount of formed impurities such as malic acid and therefore has high purity. In addition, the present invention can provide a maleic acid copolymer (or its salt) which is obtained from the resultant aqueous solution and therefore also contains only a small amount of impurities such as malic acid and therefore exhibits high calcium ion scavengeability and high clay dispersibility. Accordingly, if this copolymer (or its salt) is, for example, used for detergent compositions, inorganic-pigment dispersants, water-treating agents, and fiber-treating agents, then very excellent performance is displayed.

DETAILED DESCRIPTION OF THE PREFERRED EMBODIMENTS

Part 1

In this part 1, the present invention is more specifically illustrated by the following examples of some preferred embodiments of the present invention acrylic acid-maleic acid copolymer (or its salt) and its production process and use in comparison with comparative examples not according to the invention. However, the invention is not limited to these examples.

EXAMPLE 1-1

First of all, 310 g of ion-exchanged water and 400 g of maleic anhydride (473.7 g as maleic acid) were charged into a SUS-made separable flask of 5 liters in capacity as fitted with a reflux condenser, a stirrer, and a thermometer. Thereto, 708.3 g of 48 wt % aqueous sodium hydroxide solution (hereinafter referred to as 48%NaOHaq) was gradually added under stirring, so that the initial neutralization degree was 85 mol %, and that the initial solid component concentration was 50.9 wt %. Thereafter, while being stirred, the aqueous solution in the flask was heated to its boiling point under normal pressure. Next, under stirring, 450 g of 80 wt % aqueous acrylic acid solution (hereinafter referred to as 80%AAaq), 114.3 g of 35 wt % aqueous hydrogen peroxide solution (hereinafter referred to as 35%$H_2O_2$aq), 166.7 g of 15 wt % aqueous sodium persulfate solution (hereinafter referred to as 15%NaPSaq), and 33.3 g of ion-exchanged water were dropped from different nozzles respectively as follows: 80%AAaq was dropped over a period of 120 minutes; 35%$H_2O_2$aq was dropped over a period of 50 minutes starting at the same time with the dropping of 80%AAaq; 15%NaPSaq and ion-exchanged water were dropped over a period of 80 minutes since the dropping end of 35%$H_2O_2$aq, namely, starting 50 minutes later than the dropping start of 80%AAaq, and ending 10 minutes later than the dropping end of 80%AAaq. After the dropping end of all components, the reaction solution was kept in a boiling point reflux state for another 20 minutes to complete the polymerization, thus obtaining an acrylic acid-maleic acid copolymer (salt) having a neutralization degree of 64.5 mol % and a solid component concentration of 50 wt % at the end of the polymerization. Thereafter, the pH of this acrylic acid-maleic acid copolymer (salt) was adjusted to 8 with a 48 wt % aqueous NaOH solution.

EXAMPLES 1-2 to 1-5

Acrylic acid-maleic acid copolymers (salts) were obtained in the same way as of Example 1-1 except that the initially charging amount, the dropping amount, and the dropping period were as shown in Table 1-1. Thereafter, the pH of these acrylic acid-maleic acid copolymers (salts) were adjusted to 8 with a 48 wt % aqueous NaOH solution.

Incidentally, the copolymer (salt), as obtained in Example 1-2, had a weight-average molecular weight of 10,000 and a number-average molecular weight of 2,900 (the measurement method for the weight-average and number-average molecular weights and the measurement results of the weight-average molecular weights in the other Examples are mentioned below). Thus, the molecular weight distribution (Mw/Mn) was 3.45. In addition, the ratio of the low-molecular fractions with a molecular weight of 1,000 or less to the total of this copolymer (salt) was 8.9 wt %.

EXAMPLE 1-6

The low-molecular fractions of the copolymer (salt), as obtained in Example 1-2, were removed with a dialyzate of the differential molecular weight of 1,000 (RC Dialysis Tube Pore 6 MWCO1000; available from Ieda Trade Co., Ltd.) to obtain a purified acrylic acid-maleic acid copolymer sodium salt, specifically, as follows. The dialysis tube, which had been cut into the length of about 50 cm and of which one opening end had been closed with an exclusive use closer, was washed with ion-exchanged water. Thereafter, about 50 g of the copolymer (salt), as obtained in Example 1-2, was inserted into the washed dialysis tube from the other opening end thereof, and this end was then closed with an exclusive use closer. The resultant dialysis tube, containing the copolymer (salt), was entirely immersed into about 2 kg of ion-exchanged water in a beaker with a capacity of 2 liters to carry out a dialysis for about 2 hours. Thereafter, the aqueous solution within the dialyzate was collected into an egg-plant-shaped flask for an evaporator and then concentrated with the evaporator, and further, the solid content was then adjusted, thus obtaining an acrylic acid-maleic acid copolymer (salt) of pH 8 with a solid component concentration of 30 wt %.

The resultant copolymer (salt) had a weight-average molecular weight of 11,000 and a number-average molecular weight of 3,800, therefore, a molecular weight distribution (Mw/Mn) of 2.89. In addition, the ratio of the low-molecular fractions with a molecular weight of 1,000 or less to the total of this copolymer (salt) was 5.4 wt %.

Comparative Examples 1-1 to 1-3

Comparative acrylic acid-maleic acid copolymers (salts) were obtained in the same way as of Example 1-1 except that the initially charging amount, the dropping amount, and the dropping period were as shown in Table 1-2. Thereafter, the pH of these comparative acrylic acid-maleic acid copolymers (salts) were adjusted to 8 with a 48 wt % aqueous NaOH solution.

The acrylic acid-maleic acid copolymers (salts) of pH 8, as obtained in the above Examples and Comparative Examples, were evaluated with regard to the properties as detergent builders and water-treating agents by the following methods. The results are shown in Tables 1-3 to 1-4. Incidentally, in the following methods, the reagents and water, as used to prepare the test liquids, are all special grade ones and pure water respectively.

(Quantification of weight-average molecular weight, number-average molecular weight, molecular weight distribution, and low-molecular fractions):

The weight-average molecular weight (Mw) and the number-average molecular weight (Mn) were measured by GPC (gel permeation chromatography) under the following conditions:

Column: GF-7MHQ (made by Showa Denko Co.).

Moving phase: an aqueous solution as prepared by adding pure water to 34.5 g of disodium hydrogenphosphate dodecahydrate and 46.2 g of sodium dihydrogenphosphate dihydrate (both of which are special grade reagents; hereinafter, the reagents as used for measurement are all special grade ones) to adjust the entirety to 5,000 g, and then filtering the resultant mixture through a membrane filter of 0.45 $\mu$m.

Detector: UV 214 nm (Model 481 made by Nippon Waters Co., Ltd.).

Pump: L-7110 (made by Hitachi Co., Ltd.).

Flow rate: 0.5 ml/min.

Temperature: 35° C.

Calibration curve: sodium polyacrylate standard sample (made by Sowa Kagaku Co.).

Incidentally, the weight-average molecular weight and the number-average molecular weight were determined by regarding the area of the molecular weight of 300 or more on the resultant GPC chart as the copolymer (or its salt). Then, the molecular weight distribution was determined in terms of the resultant ratio, Mw/Mn.

In addition, the area of the molecular weight of 1,000 or less on the resultant GPC chart was regarded as the low-molecular fractions, of which the ratio to the total of the resultant copolymer (or its salt) was quantified by determining the corresponding area ratio from the results of the measurement by GPC.

(Magnesium ion scavengeability evaluation as detergent builder and water-treating agent):

(1) Magnesium standard solutions of the below-mentioned concentrations are prepared to draw a calibration curve.

0.01 M: as prepared by dissolving 2.033 g of magnesium chloride hexahydrate into 1 kg of pure water.

0.001 M: as prepared by adding pure water to 100 g of the above 0.01 M magnesium standard solution to increase its weight to 1 kg.

0.0001 M: as prepared by adding pure water to 10 g of the above 0.001 M magnesium standard solution to increase its weight to 100 g.

(2) 10 mg, in terms of solid content, of the acrylic acid-maleic acid copolymer (or its salt) is weighed out, and thereto 50 g of the above 0.001 M magnesium standard solution is added.

(3) 50 g of each of the magnesium standard solutions, as obtained in step (1) above, and the liquid, as obtained in step (2) above, are stirred with a magnetic stirrer.

(4) Thereto, a 4.8 wt % aqueous NaOH solution is added to adjust the pH to 9~11.

(5) Furthermore, 1 ml of aqueous 4M-KCL solution is added.

(6) The resultant liquid is measured with an automatic titration apparatus of which an electrode has been replaced with a divalent cationic electrode.

(7) The amount of magnesium ion, as scavenged by the acrylic acid-maleic acid copolymer (or its salt), is measured from the calibration curve.

(8) The amount of magnesium ion, as scavenged by 1 g of the acrylic acid-maleic acid copolymer (or its salt), is determined in terms of magnesium hydroxide (mg), and the resultant value is regarded as the magnesium ion scavengeability (mg Mg(OH)$_2$/g).

(Clay dispersibility in the presence of magnesium ion):

(1) A glycine buffer is prepared by adding pure water to 67.56 g of glycine, 52.6 g of sodium chloride, and 60 ml of aqueous 1N-NaOH solution (or 2.4 g of sodium hydroxide) to adjust the total weight to 600 g.

(2) A buffer is prepared by adding pure water to 0.1937 g of magnesium chloride hexahydrate and 60 g of the glycine buffer, as obtained above, to adjust the total weight to 1,000 g.

(3) About 10 g of 0.1 wt % (in terms of solid content) aqueous acrylic acid-maleic acid copolymer (or its salt) solution is prepared.

(4) A dispersion is prepared by adding 36 g of the buffer, as obtained in step (2) above, to 4 g of the 0.1 wt % aqueous acrylic acid-maleic acid copolymer (or its salt) solution, as obtained above, and then stirring them.

(5) 0.3 g of clay of 8 types of JIS test dust I (Kanto loam, fine particles; available from Japan Powder Industrial Technical Society) and 30 g of the dispersion, as obtained in step (4) above, are placed in sequence into a test tube, which is then sealed with a parafilm (clay concentration=10,000 ppm, acrylic acid-maleic acid copolymer (or its salt) concentration=100 ppm).

(6) The test tube is shaken. Then, after confirming that the lumps of clay have disappeared from the bottom of the test tube, the test tube is shaken up and down 20 times.

(7) The test tube is allowed to stand stationary for 20 hours in a place where the test tube is not exposed to direct sunlight.

(8) After 20 hours, 5 g of supernatant of the dispersion is sampled into a screw tube of 20 ml in capacity.

(9) The absorbance (%) is measured with a UW spectroscope as started up beforehand (1 cm cell, wave length=380 nm).

(Magnesium hydroxide scale inhibitability evaluation as detergent builder and water-treating agent):

(Test conditions):

mayonnaise bottle (prescription=200 cc)

temperature: 90° C.

acrylic acid-maleic acid copolymer (or its salt) concentration: 5 ppm $Mg^{2+}$ concentration: 100 ppm (1) A solution is prepared by weighing out 0.881 g of magnesium chloride hexahydrate and 0.459 g of sodium carbonate anhydride and adding thereto pure water to adjust the total weight to 1,000 g.

(2) 190 g of the solution, as obtained in step (1) above, is placed into a mayonnaise bottle of 225 ml in capacity.

(3) Furthermore, 1 g of 0.1 wt % (in terms of solid content) aqueous acrylic acid-maleic acid copolymer (or its salt) solution is added.

(4) The pH is adjusted to 10±0.2 with a 4.8 wt % aqueous sodium hydroxide solution.

(5) Pure water is added to adjust the total weight to 200 g.

(6) The bottle is allowed to stand stationary for 20 hours in a hot-air drying oven as set to 90° C.

(7) After cooling the bottle under running water, the contents of the bottle are filtrated with a 0.1 μm membrane filter.

(8) The filtrate is analyzed by ICP (inductively coupled plasma) emission spectrometry to measure the $Mg^{2+}$ concentration.

(9) The case of no acrylic acid-maleic acid copolymer (or no salt thereof) is measured as the blank.

(10) The magnesium hydroxide scale inhibition rate is calculated from the following equation:

$$\text{Scale inhibition rate } (\%) = \{(Z-Y)/(X-Y)\} \times 100$$

wherein:

X is the $Mg^{2+}$ concentration (ppm) in the solution before the test, namely, 100 ppm;

Y is an $Mg^{2+}$ concentration (ppm) in a filtrate free from the acrylic acid-maleic acid copolymer (or its salt) (blank); and Z is an $Mg^{2+}$ concentration (ppm) in a filtrate after the test of the sample.

Incidentally, the Mg standard solution for drawing a calibration curve is prepared in the following way.

a) 10 g of pure water is added to 190 g of the solution as obtained in step (1) above, and the resultant mixture is regarded as 100%.

b) The mixture, as obtained in step a) above, is diluted to 2 times by weight, and the resultant mixture is regarded as 50%.

c) Pure water is regarded as 0%.

(Calcium carbonate scale inhibitability evaluation as detergent builder and water-treating agent):

Into a glass bottle having a capacity of 225 ml, there was charged 170 g of water, into which 10 g of 1.56 wt % aqueous calcium chloride dihydrate solution and 3 g of 0.02 wt % aqueous solution of each acrylic acid-maleic acid copolymer (or its salt) sample (3 ppm as based on the resulting supersaturated aqueous solution) were then mixed. Moreover, 10 g of aqueous sodium bicarbonate solution and 7 g of sodium chloride were added to adjust the total weight to 200 g. The resultant supersaturated aqueous solution of calcium carbonate having a concentration of 530 ppm was sealed and then heated at 70° C. for 12 hours. After cooling, the resultant precipitate was filtrated with a 0.1 μm membrane filter, and the filtrate was analyzed according to JIS K 0101.

The calcium carbonate scale inhibition rate (%) was determined from the following equation:

$$\text{Scale inhibition rate } (\%) = \{(C-B)/(A-B)\} \times 100$$

wherein:

A is the concentration (%) of calcium which was dissolved in the solution before the test;

B is a calcium concentration (%) in a filtrate free from the acrylic acid-maleic acid copolymer (or its salt); and C is a calcium concentration (%) in a filtrate after the test.

In addition, the acrylic acid-maleic acid copolymers (salts) of pH 8, as obtained in the above Examples and Comparative Examples, were evaluated with regard to the performances as fiber-treating agents, inorganic-pigment dispersants, and detergent compositions by the following methods.

(Evaluation as fiber-treating agent):

The acrylic acid-maleic acid copolymer (or its salt) was used in an amount of 2 g/L as a fiber-treating agent to bleach plain-stitch-knitted, scoured cotton fabrics under the following conditions. Results thereof are shown in Table 1-5.

(Bleaching conditions):

Hardness of water as used: 35.DH

Bath ratio: 1:25

Temperature: 85° C.

Period: 30 minutes

Chemicals as used:

Hydrogen peroxide: 10 g/L

Sodium hydroxide: 2 g/L

3 Sodium silicate: 5 g/L (Evaluation):

The feeling of the treated cloth was judged by a sensory examination method.

The degree of whiteness was measured using a 3M color computer SM-3 model, made by SUGA TEST MACHINE Co., to determine the degree of whiteness (W) from the following whiteness degree equation in the Lab system for evaluation.

$$W=100-\{(100-L)^2+a^2+b^2\}^{1/2}$$

wherein:

L is a lightness as measured;

a is a chromatic index as measured; and b is a chromatic index as measured.

The higher degree of whiteness is better.

The sewability was evaluated from the number of places where base yarn of the cloth was broken in the case where 4 sheets of the cloth were placed on each other to sew them by 30 cm with a needle #11S using a main sewing machine, but with no sewing yarn. The smaller number of the places where base yarn of the cloth was broken is better.

(Evaluation as inorganic-pigment dispersant):

Into a beaker (material quality: SUS 304, inner diameter: 90 mm, height: 160 mm) having a capacity of 1 liter, there was placed 400 weight parts of filter-press-dehydrated cake (solid content: 65.3 wt %) of calcite type cubic light calcium carbonate (primary particle diameter: 0.15 μm). hereto, 3.26 weight parts of 40 wt % aqueous solution of the acrylic acid-maleic acid copolymer (or its salt) (the weight of this copolymer (or its salt) is 0.5 wt % as based on the weight of the calcium carbonate) as the dispersant and 6.9 weight parts of water for adjusting the solid component concentration were added to mix them by kneading at a low speed for 3 minutes using a dissolver vane (50 mm φ). Then, an aqueous dispersion having a solid component concentration of 64 wt % was produced by a dispersing operation of the kneaded mixture at 3,000 rpm for 10 minutes. The viscosity of the resultant aqueous dispersion was measured using a B-type viscometer at 25° C. both just after the aqueous dispersion had been produced and after the resultant aqueous dispersion had been allowed to stand stationary at room temperature for 1 week, whereby the stability over a period of time was tested. The lower viscosity of the dispersion is better. Results of the measurement are shown in Table 1-6.

(Evaluation as detergent composition):

Artificial grime of the composition of Table 1-7 was dispersed into carbon tetrachloride to prepare an artificial grime solution, and white cotton cloth was passed through this artificial grime solution, and then dried, and then cut to make 10 cm×10 cm dirty cloth.

The detergent compositions of Table 1-8 were formulated to wash the above dirty cloth under the conditions of Table 1-9. Water for washing was prepared by adding calcium chloride and magnesium chloride into ion-exchanged water. After being washed and rinsed, the cloth was dried to measure its reflectivity.

The washing ratio of the dirty cloth was determined from its reflectivity using the below-mentioned equation, thus evaluating the detergency. Results are shown in Table 1-10.

Washing ratio=[{(reflectivity after washing)−(reflectivity before washing)}/{(reflectivity of white cloth)−(reflectivity before washing)}]×100

In addition, the above dirty cloth was subjected to a washing test (washing, rinsing, and drying) continuously 5 times under the same washing conditions as above. Then, the touch of the washed cloth was evaluated. The results are shown in Table 1-10.

TABLE 1-1

| | | Example 1-1 | Example 1-2 | Example 1-3 | Example 1-4 | Example 1-5 |
|---|---|---|---|---|---|---|
| Initially | Anhydrous MA | | | | | |
| charging | (g) | 400 | 450 | 500 | 550 | 500 |
| amount | (mol) | 4.08 | 4.59 | 5.1 | 5.61 | 5.1 |
| | Ion-exchanged water (g) | 310 | 310 | 100 | 200 | 200 |
| | 48% NaOHaq | | | | | |
| | (g) | 708.3 | 708.3 | 708.3 | 700 | 750 |
| | (mol) | 8.5 | 8.5 | 8.5 | 8.4 | 9.0 |
| Initial | Neutralization degree (mol %) | 85 | 85 | 85 | 74.9 | 88.2 |
| | Solid component concentration (wt %) | 50.9 | 50.9 | 59.1 | 57.6 | 54.4 |
| Dropping | 80% AAaq | 450 | 450 | 450 | 450 | 450 |
| amount | (g) | | | | | |
| | (mol) | 5 | 5 | 5 | 5 | 5 |
| | 35% H$_2$O$_2$aq | | | | | |
| | (g) | 114.3 | 100 | 114.3 | 114.3 | 114.3 |
| | (g/mol) | 4 | 3.5 | 4 | 4 | 4 |
| | 15% NaPSaq | | | | | |
| | (g) | 166.7 | 200 | 166.7 | 166.7 | 166.7 |
| | (g/mol) | 2.5 | 3 | 2.5 | 2.5 | 2.5 |
| | Ion-exchanged water (g) | 33.3 | 30 | 200 | 100 | 100 |

TABLE 1-1-continued

|  |  | Example 1-1 | Example 1-2 | Example 1-3 | Example 1-4 | Example 1-5 |
|---|---|---|---|---|---|---|
| Dropping period (minutes) | 80% AAaq | 0~120 | 0~120 | 0~120 | 0~150 | 0~150 |
|  | 35% $H_2O_2$aq | 0~50 | 0~50 | 0~50 | 0~80 | 0~80 |
|  | 15% NaPSaq | 50~130 | 50~130 | 50~130 | 50~150 | 50~150 |
|  | Ion-exchanged water | 50~130 | 50~130 | 50~130 | 50~150 | 50~150 |
| At end of polymerization | Neutralization degree (mol %) | 64.5 | 60 | 55.9 | 51.8 | 59.2 |
|  | Solid component concentration (wt %) | 50 | 52.2 | 53.4 | 53.5 | 51.5 |

MA: maleic acid
AA: acrylic acid

TABLE 1-2

|  |  | Comparative Example 1-1 | Comparative Example 1-2 | Comparative Example 1-3 |
|---|---|---|---|---|
| Initially charging amount | Anhydrous MA |  |  |  |
|  | (g) | 100 | 200 | 300 |
|  | (mol) | 1.02 | 2.09 | 3.06 |
|  | Ion-exchanged water (g) | 300 | 200 | 169.2 |
|  | 48% NaOHaq |  |  |  |
|  | (g) | 170 | 340 | 510 |
|  | (mol) | 2.04 | 4.08 | 6.12 |
| Initial | Neutralization degree (mol %) | 100 | 100 | 100 |
|  | Solid component concentration (wt %) | 28.6 | 44.1 | 50 |
| Dropping amount | 80% AAaq |  |  |  |
|  | (g) | 450 | 450 | 450 |
|  | (mol) | 5 | 5 | 5 |
|  | 35% $H_2O_2$aq |  |  |  |
|  | (g) | 114.3 | 114.3 | 114.3 |
|  | (g/mol) | 4 | 4 | 4 |
|  | 15% NaPSaq |  |  |  |
|  | (g) | 666.5 | 133.3 | 133.3 |
|  | (g/mol) | 10 | 2 | 2 |
|  | Ion-exchanged water (g) | 424 | 328.15 | 97.89 |
| Dropping period (minutes) | 80% AAaq | 0~150 | 0~150 | 0~150 |
|  | 35% $H_2O_2$aq | 0~80 | 0~80 | 0~80 |
|  | 15% NaPSaq | 50~150 | 50~150 | 50~150 |
|  | Ion-exchanged water | 50~150 | 50~150 | 50~150 |
| At end of polymerization | Neutralization degree (mol %) | 29 | 45 | 55 |
|  | Solid component concentration (wt %) | 28 | 40 | 49 |

MA: maleic acid
AA: acrylic acid

TABLE 1-3

|  | Example 1-1 | Example 1-2 | Example 1-3 | Example 1-4 | Example 1-5 | Example 1-6 |
|---|---|---|---|---|---|---|
| MA/AA (molar ratio) | 45/55 | 48/52 | 50.5/49.5 | 52.9/47.1 | 50.5/49.5 | 48/52 |
| Weight-average molecular weight | 13,000 | 10,000 | 8,000 | 8,000 | 9,000 | 11,000 |
| Mg ion scavengeability (mg Mg(OH)$_2$/g) | 240 | 235 | 230 | 235 | 235 | 250 |
| Clay dispersibility in presence of Mg ion (%) | 73.5 | 75 | 77 | 75 | 76 | 73 |
| Magnesium hydroxide scale inhibitability (%) | 37 | 38 | 37 | 39 | 38 | 34 |
| Calcium carbonate scale inhibitability (%) | 78 | 80 | 75 | 85 | 83 | — |

MA: maleic acid
AA: acrylic acid

TABLE 1-4

|  | Comparative Example 1-1 | Comparative Example 1-2 | Comparative Example 1-3 |
|---|---|---|---|
| MA/AA (molar ratio) | 17/83 | 29/71 | 38/62 |
| Weight-average molecular weight | 10,000 | 55,000 | 9,000 |
| Mg ion scavengeability (mg Mg(OH)$_2$/g) | 190 | 210 | 200 |
| Clay dispersibility in presence of Mg ion (%) | 65 | 49 | 69 |
| Magnesium hydroxide scale inhibitability (%) | 20 | 25 | 28 |
| Calcium carbonate scale inhibitability (%) | 79 | 38 | 58 |

MA: maleic acid
AA: acrylic acid

TABLE 1-5

(Evaluation as fiber-treating agent)

|  | Feeling* | Degree of whiteness (W value) | Sewability (number of base yarn-broken places) |
|---|---|---|---|
| Example 1-1 | ○ | 96.3 | 37 |
| Example 1-2 | ○ | 95.8 | 38 |
| Example 1-3 | ○ | 97.1 | 37 |
| Example 1-4 | ○ | 97.3 | 36 |
| Example 1-5 | ○ | 97.5 | 35 |
| Comparative Example 1-1 | Δ | 85.3 | 69 |
| Comparative Example 1-2 | Δ | 89.2 | 72 |
| Comparative Example 1-3 | ○ | 93.1 | 42 |

*Feeling:
soft ○
somewhat hard Δ
considerably hard X

TABLE 1-6

(Evaluation as inorganic-pigment dispersant)

| | Viscosity of aqueous dispersion (cP) | |
|---|---|---|
|  | Just after production of dispersion | After being allowed to stand stationary at room temperature for 1 week |
| Example 1-1 | 280 | 305 |
| Example 1-2 | 270 | 290 |
| Example 1-3 | 290 | 310 |
| Example 1-4 | 310 | 330 |
| Example 1-5 | 280 | 290 |
| Comparative Example 1-1 | 890 | 1010 |
| Comparative Example 1-2 | 1200 | 1800 |
| Comparative Example 1-3 | 410 | 460 |

TABLE 1-7

(Composition of grime)

| Components | wt % |
|---|---|
| Carbon black (designated by JAPAN OIL CHEMIST'S SOCIETY) | 0.5 |
| Clay | 49.75 |
| Myristylic acid | 8.3 |
| Oleic acid | 8.3 |
| Tristearic acid | 8.3 |
| Triolein | 8.3 |
| Cholesterin | 4.38 |
| Cholesterin stearate | 1.09 |
| Paraffin wax (m.p. 50–52° C.) | 0.552 |
| Squalene | 0.552 |

TABLE 1-8

(Detergent composition)

| Components | wt % |
|---|---|
| Sodium salt of linear chain alkylbenzenesulfonic acid (C = 11.5) | 30 |
| Polyoxyethylene alkyl ether (C = 12, EO = 8) | 15 |
| Zeolite | 10 |
| Enzyme (protease) | 0.5 |
| Acrylic acid-maleic acid copolymer (or its salt) | 20 |
| Sodium carbonate | 15 |
| #1 Sodium silicate | 9.5 |

TABLE 1-9

Washing conditions

| Temperature | 20° C. |
|---|---|
| Bath ratio | 1/60 |
| Detergent concentration | 0.5 wt % |
| Water quality  Ca$^{2+}$ concentration | 50 ppm |
| Mg$^{2+}$ concentration | 80 ppm |
| Terg-O-Tometer | 10 minutes |

Terg-O-Tometer: made by Ueshima Seisakusho Co., Ltd.

TABLE 1-10

(Evaluation as detergent composition)

|  | Washing ratio (%) | Touch after washing 5 times* |
|---|---|---|
| Example 1-1 | 97 | ○ |
| Example 1-2 | 98 | ○ |
| Example 1-3 | 96 | ○ |
| Example 1-4 | 98 | ○ |
| Example 1-5 | 97 | ○ |
| Comparative Example 1-1 | 83 | x |
| Comparative Example 1-2 | 85 | Δ |
| Comparative Example 1-3 | 87 | Δ |

*: Greatly starchy x
Medium starchy Δ
Little starchy ○

Part 2

In this part 2, the present invention is also more specifically illustrated by the following examples of some preferred embodiments of the present invention production process for the aqueous maleic salt solution and those of the present invention maleic acid copolymer (or its salt) resultant from this aqueous solution in comparison with comparative examples not according to the invention. However, the invention is not limited to these examples. Incidentally, in the examples, unless otherwise noted, the units "%" and "part(s)" denote those by weight.
(Methods to measure properties):

<Method to measure malic and fumaric acids contents>
As measured by GPC.
Column: G300 OPWXL (made by TOSOH Corporation).
Column temperature: 35° C.
Moving phase: 0.1% aqueous phosphoric acid solution.
Flow rate: 1.0 ml/min.
Detector: UV 200 nm (Model L-6000 made by Hitachi).
Calibration curves: as drawn with malic and fumaric acids (both of which are special grade reagents), of which the contents were calculated in terms of their respective sodium salts.

<Weight-average molecular weight (hereinafter referred to as Mw)>
As measured by GPC.
Column: GF-7MHQ (made by Showa Denko Co.).
Column temperature: 35° C.
Moving phase: an aqueous solution as prepared by adding pure water to 34.5 g of disodium hydrogenphosphate dodecahydrate and 46.2 g of sodium dihydrogenphosphate dihydrate (both of which are special grade reagents; hereinafter, the reagents as used for measurement are all special grade ones) to adjust the entirety to 5,000 g, and then filtering the resultant mixture through a membrane filter of 0.45 μm.
Detector: UV 214 nm (Model 481 made by Nippon Waters Co., Ltd.).
Flow rate: 0.5 ml/min.
Calibration curve: sodium polyacrylate standard sample (made by Sowa Kagaku Co.).

<Amounts of residual maleic and acrylic acids>
These amounts were measured by the same method as the above measurement method for the malic and fumaric acids content, and the calibration curves were drawn with maleic anhydride and a 80% aqueous acrylic acid solution as used respectively, and the amounts of residual maleic and acrylic acids were determined in terms of their respective sodium salts.

<Calcium Ion Scavengeability>
(1) First, aqueous calcium ion standard solutions (aqueous solutions to draw a calibration curve) were prepared by the following steps of preparing 50 cc each of aqueous solutions with $Ca^{2+}$ ion concentrations of 0.01 mol/l, 0.001 mol/l, and 0.0001 mol/l respectively, and then adjusting their pH to 9~11 with a 4.8% aqueous sodium hydroxide solution, and then adding thereto 1 ml of 4 mol/l aqueous potassium chloride solution.

(2) Next, an aqueous solution of the sample to be measured was prepared as follows. First, 10 g (in terms of solid content) of copolymer (or its salt) (with pH adjusted to 7) was weighed out into a 100 cc beaker, and thereto 50 cc of 0.001 mol/l aqueous calcium ion solution (as prepared with sodium chloride dihydrate) was added, and the resultant mixture was uniformly stirred with a stirrer. Thereafter, the pH was adjusted to 9~11 with a 4.8% aqueous sodium hydroxide solution, and further, 1 ml of 4 mol/l aqueous potassium chloride solution was added.

(3) The measurement was carried out with a calcium ion electrode 93-20 (made by OLION Co.) using an ion analyzer EA920 (made by OLION Co.).

(4) The amount of calcium ion, as scavenged by the sample, was determined from the calibration curve and the measured value of the sample (copolymer (or its salt)). Then, the determined amount per g of the solid content of the copolymer (or its salt) was denoted with the mg number in terms of calcium carbonate, and its value was regarded as the calcium ion scavengeability value.

<Clay dispersibility>
(1) First, a glycine buffer was prepared by adding ion-exchanged water to 67.56 g of glycine, 52.6 g of sodium chloride, and 60 ml of 1N-NaOH to adjust the total weight to 600 g.

(2) A dispersion was prepared by weighing out 0.0817 g of calcium chloride dihydrate and 60 g of the glycine buffer, as prepared in step (1) above, and adding thereto ion-exchanged water to adjust the total weight to 1,000 g.

(3) Next, a 0.1% (in terms of solid content) aqueous solution of copolymer (or its salt) (with pH adjusted to 7) was prepared.

(4) 0.3 g of clay of 8 types of JIS test dust I (Kanto loam, fine particles; available from Japan Powder Industrial Technical Society) is placed into a test tube. Thereto, 27 g of the dispersion, as prepared in step (2) above, and 3 g of the aqueous solution, as prepared in step (3) above, are added, thus obtaining a test liquid, of which the calcium ion concentration is 50 ppm in terms of calcium carbonate,.

(5) The test tube was sealed with a parafilm, and then shaken gently so that the clay would be dispersed into the entirety of the test liquid. Thereafter, the test tube was further shaken up and down 20 times.

(6) The test tube was allowed to stand stationary for 20 hours in a place where the test tube was not exposed to direct sunlight. Thereafter, 5 ml of supernatant of the dispersion was sampled with a whole pipet.

(7) The absorbance (ABS) of the sampled liquid was measured with a 1-cm cell using a UV spectroscope (wave length=380 nm), and the resultant value was regarded as the clay dispersibility.

EXAMPLE 2-1

First of all, 332 g of ion-exchanged water was charged into a SUS-made separable flask of 2.5 liters in capacity as fitted with a reflux condenser and a stirrer, and this ion-exchanged water was then heated to 60° C. while stirred. Thereafter, under stirring, 588 g (6 mol) of melted maleic anhydride and a 48% aqueous sodium hydroxide solution (12 mol in terms of sodium hydroxide) were dropped from different dropping inlets over a period of 60 minutes. On the way, the aqueous reaction solution fell into a reflux state (110° C. or higher) 8 minutes after the initiation of the dropping, and this reflux state continued till the end of the dropping.

Immediately after the end of the dropping, the reaction had finished, thus obtaining a 100%-neutralized aqueous sodium maleate solution with a solid component concentration of 50%. The amounts of formed malic and fumaric acids in the resultant aqueous solution were 1,800 ppm and 330 ppm respectively.

EXAMPLES 2-2 to 2-15

The neutralization reactions were carried out in the same way as of Example 2-1 except that the initially charging amount and the dropping amount were as shown in Tables 2-1 and 2-2. Incidentally, in cases where the amount of the initially charged 48% aqueous sodium hydroxide solution is shown in the table, the ion-exchanged water and the 48% aqueous sodium hydroxide solution were initially charged in sequence and then heated to 60° C. to carry out the neutralization reactions.

As a result, aqueous sodium maleate solutions with the solid component concentrations and the neutralization degrees as similarly shown in Tables 2-1 and 2-2 were obtained, and the amounts of formed malic and fumaric acids in the resultant aqueous solutions were as shown in Tables 2-1 and 2-2.

COMPARATIVE EXAMPLES 2-1 to 2-2

The neutralization reactions were carried out in the same way as of Example 2-1 except that the initially charging amount and the dropping amount were as similarly shown in Table 2-2. Incidentally, in Comparative Example 2—2, the ion-exchanged water and tablets of maleic anhydride were initially charged in sequence and then heated to carry out the neutralization reaction.

The results are shown in Tables 2-1 and 2—2. It is clear that the amount of malic acid was increased in Comparative Example 2–1, and that the amount of fumaric acid w as increased in Comparative Example 2-2.

EXAMPLE 2-16

Immediately after being prepared, 1,600 g (5 mol in terms of sodium maleate) of the aqueous sodium maleate solution, as obtained in Example 2-6, was charged into a SUS-made separable flask of 5 liters in capacity as fitted with a reflux condenser and a stirrer. Then, this solution was heated again under stirring and thereby caused to fall into a boiling point reflux state. Thereafter, while this state was kept, 450 g (5 mol in terms of acrylic acid) of 80% aqueous acrylic acid solution and 120 g of 35% aqueous hydrogen peroxide solution began being dropped from different nozzles simultaneously, wherein the 80% aqueous acrylic acid solution and the 35% aqueous hydrogen peroxide solution were continuously and uniformly dropped over periods of 120 minutes and 50 minutes respectively. Furthermore, 160 g of 15% aqueous sodium persulfate solution and 350 g of ion-exchanged water were continuously and uniformly dropped from different nozzles over a period of 80 minutes starting 50 minutes later than the dropping start of the 80% aqueous acrylic acid solution, namely, starting at the dropping end of the 35% aqueous hydrogen peroxide solution, accordingly, ending 10 minutes later than the dropping end of the 80% aqueous acrylic acid solution. After the dropping end of all components, the boiling point reflux state was kept for another 20 minutes to complete the polymerization.

After the end of the polymerization, the reaction mixture was left cooled, and thereto 229.2 g (2.75 mol in terms of sodium hydroxide) of 48 % aqueous sodium hydroxide solution was added, and then the resultant mixture was diluted, thus obtaining an aqueous maleic acid copolymer (salt) solution with a solid component concentration of 45% and a pH of 7.5.

From the results of the property measurement by the aforementioned methods, it was found that the resultant copolymer (salt) had a weight-average molecular weight of 9,800, a calcium ion scavengeability of 455, a clay dispersibility of 0.82, a malic acid content of 7.6% in the solid content of the copolymer (salt), an amount of residual maleic acid of 820 ppm, and an amount of residual acrylic acid of 80 ppm, and further, a magnesium ion scavengeability of 240 mg $Mg(OH)_2$/g, a clay dispersibility of 75% in the presence of magnesium ion, and a magnesium hydroxide scale inhibitability of 34%.

EXAMPLE 2-17

An aqueous maleic acid copolymer (salt) solution with a solid component concentration of 45% and a pH of 7.5 was obtained by carrying out a polymerization reaction in the same way as of Example 2-16 except that the aqueous sodium maleate solution, as obtained in Example 2-6, was replaced with the aqueous sodium maleate solution as obtained in Example 2-1. From the results of the similar property measurement, it was found that the resultant copolymer (salt) had a weight-average molecular weight of 9,500, a calcium ion scavengeability of 460, a clay dispersibility of 0.86, a malic acid content of 4.1% in the solid content of the copolymer (salt), an amount of residual maleic acid of 1,500 ppm, and an amount of residual acrylic acid of 120 ppm, and further, a magnesium ion scavengeability of 245 mg $Mg(OH)_2$/g, a clay dispersibility of 80% in the presence of magnesium ion, and a magnesium hydroxide scale inhibitability of 37%.

COMPARATIVE EXAMPLE 2-3

A comparative aqueous maleic acid copolymer (salt) solution with a solid component concentration of 45% and a pH of 7.5 was obtained by carrying out a polymerization reaction in the same way as of Example 2-16 except that the aqueous sodium maleate solution, as obtained in Example 2-6, was replaced with the comparative aqueous sodium maleate solution as obtained in Comparative Example 2-1. From the results of the similar property measurement, it was found that the resultant comparative copolymer (salt) had a weight-average molecular weight of 9,600, a calcium ion scavengeability of 415, a clay dispersibility of 0.62, a malic acid content of 12.9% in the solid content of the copolymer (salt), an amount of residual maleic acid of 780 ppm, and an amount of residual acrylic acid of 80 ppm, and further, a magnesium ion scavengeability of 210 mg $Mg(OH)_2$/g, a clay dispersibility of 60% in the presence of magnesium ion, and a magnesium hydroxide scale inhibitability of 24%.

Thus, it is clear that the same copolymer (or its salt) production process gave almost the same results with regard to the weight-average molecular weight, the amount of residual maleic acid, and the amount of residual acrylic acid, but that the malic acid content was greatly increased in comparison with Example 2-16, so the calcium ion scavengeability was greatly deteriorated, and the day dispersibility was also deteriorated. The above results are collectively shown in Tables 2-1 and 2-2.

TABLE 2-1

|  |  | Example 2-1 | Example 2-2 | Example 2-3 | Example 2-4 | Example 2-5 | Example 2-6 | Example 2-7 | Example 2-8 | Example 2-9 |
|---|---|---|---|---|---|---|---|---|---|---|
| Operational conditions | | | | | | | | | | |
| Initially charged: | | | | | | | | | | |
| Ion-exchanged water | (g) | 332 | 240.6 | 157.5 | 332 | 332 | 332 | 157.5 | 402.8 | 235.5 |
| 48% NaOH | (g) | — | — | — | 100 | 200 | 400 | 400 | — | — |
|  | (mol) | — | — | — | 1.2 | 2.4 | 4.8 | 4.8 | — | — |

TABLE 2-1-continued

|  |  | Example 2-1 | Example 2-2 | Example 2-3 | Example 2-4 | Example 2-5 | Example 2-6 | Example 2-7 | Example 2-8 | Example 2-9 |
|---|---|---|---|---|---|---|---|---|---|---|
| Dropped: |  |  |  |  |  |  |  |  |  |  |
| Anhydrous MA | (g) | 588 | 588 | 588 | 588 | 588 | 588 | 588 | 588 | 588 |
|  | (mol) | 6 | 6 | 6 | 6 | 6 | 6 | 6 | 6 | 6 |
| 48% NaOH | (g) | 1000 | 1000 | 1000 | 900 | 800 | 600 | 600 | 850 | 850 |
|  | (mol) | 12 | 12 | 12 | 10.8 | 9.6 | 7.2 | 7.2 | 10.2 | 10.2 |
| Neutralization degree | (%) | 100 | 100 | 100 | 100 | 100 | 100 | 100 | 85 | 85 |
| Solid component concentration | (%) | 50 | 52.5 | 55 | 50 | 50 | 50 | 55 | 50 | 55 |
| MA dropping period | (min) | 0~60 | 0~60 | 0~60 | 0~60 | 0~60 | 0~60 | 0~60 | 0~60 | 0~60 |
| NaOH dropping period | (min) | 0~60 | 0~60 | 0~60 | 5~60 | 10~60 | 20~60 | 20~60 | 0~60 | 0~60 |
| Results |  |  |  |  |  |  |  |  |  |  |
| Dropping initiation temperature | (° C.) | 60 | 60 | 60 | 60 | 60 | 60 | 60 | 60 | 60 |
| Reflux initiation time | (min) | 8 | 6 | 5 | 6 | 7 | 7 | 5 | 9 | 6 |
| Amount of formed malic acid | (ppm) | 1800 | 1700 | 1400 | 2200 | 2800 | 4100 | 3500 | 1700 | 1300 |
| Amount of formed fumaric acid | (ppm) | 330 | 300 | 250 | 310 | 280 | 520 | 460 | 220 | 240 |

TABLE 2-2

|  |  | Example 2-10 | Example 2-11 | Example 2-12 | Example 2-13 | Example 2-14 | Example 2-15 | Comparative Example 2-1 | Comparative Example 2-2 |
|---|---|---|---|---|---|---|---|---|---|
| Operational conditions |  |  |  |  |  |  |  |  |  |
| Initially charged: |  |  |  |  |  |  |  |  |  |
| Ion-exchanged water | (g) | 402.8 | 402.8 | 402.8 | 473.6 | 332 | 332 | 332 | 332 |
| Anhydrous MA | (g) | — | — | — | — | — | — | — | 588 |
|  | (mol) | — | — | — | — | — | — | — | 6 |
| 48% NaOH | (g) | 200 | 300 | 425 | — | 800 | 600 | 1000 | — |
|  | (mol) | 2.4 | 3.6 | 5.1 | — | 9.6 | 7.2 | 12 | — |
| Dropped: |  |  |  |  |  |  |  |  |  |
| Anhydrous MA | (g) | 588 | 588 | 588 | 588 | 588 | 588 | 588 | — |
|  | (mol) | 6 | 6 | 6 | 6 | 6 | 6 | 6 | — |
| 48% NaOH | (g) | 650 | 550 | 425 | 700 | 200 | 400 | — | 1000 |
|  | (mol) | 7.8 | 6.6 | 5.1 | 8.4 | 2.4 | 4.8 | — | 12 |
| Neutralization degree | (%) | 85 | 85 | 85 | 70 | 100 | 100 | 100 | 100 |
| Solid component concentration | (%) | 50 | 50 | 50 | 50 | 50 | 50 | 50 | 50 |
| MA dropping period | (min) | 0~60 | 0~60 | 0~60 | 0~60 | 0~60 | 0~60 | 0~60 | — |
| NaOH dropping period | (min) | 10~60 | 0~60 | 20~60 | 0~60 | 30~60 | 30~60 | — | 0~60 |
| Results |  |  |  |  |  |  |  |  |  |
| Dropping initiation temperature | (° C.) | 60 | 60 | 60 | 60 | 60 | 60 | 60 | 60 |
| Reflux initiation time | (min) | 7 | 8 | 8 | 10 | 7 | 7 | 8 | 10 |
| Amount of formed malic acid | (ppm) | 2200 | 3100 | 4300 | 1400 | 35000 | 11000 | 45000 | 9800 |
| Amount of formed fumaric acid | (ppm) | 390 | 420 | 520 | 470 | 2800 | 950 | 5200 | 21000 |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A acrylic acid-maleic acid copolymer (or its salt), which is obtained by copolymerizing ethylenically unsaturated monomers including acrylic acid and maleic acid in the presence of a polymerization initiator, wherein the maleic acid has a neutralization degree of 70–95 mol % before the polymerization initiator is charged, and wherein the copolymer (or its salt) has a magnesium ion scavengeabilitiy of 230 mg (in terms of $Mg(OH)_2$/g or more and a magnesium scale inhibitablity of 30% or more.

2. An acrylic acid-maleic acid copolymer (or its salt) according to claim 1, which further has a clay dispersibility of 60% or more in the presence of magnesium ion where the percent of clay dispersibility equals the percent of absorbance and where the percent of absorbance is determined by the following steps of:

a) preparing a glycine buffer by adding pure water to 67.56 g of glycine, 52.6 g of sodium chloride, and 60 ml of aqueous 1N-NaOH solution to adjust the total weight of the glycine buffer to 600 g; then b) preparing a second buffer by adding pure water to 0.1937 g of magnesium chloride hexahydrate and 60 g of the glycine buffer to adjust the total weight of the second buffer to 1,000 g; then c) preparing about 10 g of 0.1 wt % (in terms of solid content) aqueous acrylic acid-maleic acid copolymer solution; then d) preparing a dispersion by adding 36 g of the second buffer to 4 g of the 0.1 wt % aqueous acrylic acid-maleic acid copolymer solution and then stirring the dispersion; then e) placing in sequence 0.3 g of type B of JIS test dust I (Kanto loam, fine particles) and 30 g of the dispersion into a test tube, then sealing the test tube with parafilm;

f) shaking the test tube, then confirming that lumps of clay have disappeared from a bottom of the test tube, then shaking the test tube up and down 20 times; then g) allowing the test tube to stand stationary for 20 hours out of exposure to direct sunlight; then h) placing 5 g of supernatant of the dispersion in the test tube into a screw tube of 20 ml in capacity; then i) calibrating a UV spectroscope to where a wave length equals 380 nm for a one cm cell; and j) placing the screw tube having the 5 g of supernatant into the UV spectroscope and measuring the percent of absorbance, which equals the percent of clay dispersibility.

3. An acrylic acid-maleic acid copolymer (or its salt) according to claim 1, which further has a molecular weight distribution of 3.5 or less and low-molecular fractions with a molecular weight of 1,000 or less in the ratio of 9 wt % or less to the total of the copolymer (or its salt).

4. An acrylic acid-maleic acid copolymer (or its salt) according to claim 2, which further has a molecular weight distribution of 3.5 or less and low-molecular fractions with a molecular weight of 1,000 or less in the ratio of 9 wt % or less to the total of the copolymer (or its salt).

5. An acrylic acid-maleic acid copolymer (or its salt), which is obtained by copolymerizing ethylenically unsaturated monomers including acrylic acid and maleic acid in the presence of a polymerization initiator, wherein the maleic acid has a neutralization degree of 70–95 mol % before the polymerization initiator is charged, and wherein the copolymer (or its salt) has a magnesium ion scavengeability of 230 mg (in terms of $Mg(OH)_2$ )/g or more, a molecular weight distribution of 3.5 or less, and low-molecular fractions with a molecular weight of 1,000 or less in the ratio of 9 wt % or less to the total of the copolymer (or its salt).

6. A detergent composition, comprising the acrylic acid-maleic acid copolymer (or its salt) as recited in claim 1 and a surfactant.

7. A detergent composition, comprising the acrylic acid-maleic acid copolymer (or its salt) as recited in claim 2 and a surfactant.

8. A detergent composition, comprising the acrylic acid-maleic acid copolymer (or its salt) as recited in claim 3 and a surfactant.

9. A detergent composition, comprising the acrylic acid-maleic acid copolymer (or its salt) as recited in claim 4 and a surfactant.

10. A detergent composition, comprising the acrylic acid-maleic acid copolymer (or its salt) as recited in claim 5 and a surfactant.

11. A detergent builder, comprising the acrylic acid-maleic acid copolymer (or its salt) as recited in claim 1.

12. A detergent builder, comprising the acrylic acid-maleic acid copolymer (or its salt) as recited in claim 2.

13. A detergent builder, comprising the acrylic acid-maleic acid copolymer (or its salt) as recited in claim 3.

14. A detergent builder, comprising the acrylic acid-maleic acid copolymer (or its salt) as recited in claim 4.

15. A detergent builder, comprising the acrylic acid-maleic acid copolymer (or its salt) as recited in claim 5.

* * * * *

UNITED STATES PATENT AND TRADEMARK OFFICE
CERTIFICATE OF CORRECTION

PATENT NO.    : 6,444,771 B1
DATED         : September 3, 2002
INVENTOR(S)   : Shigeru Yamaguchi, Yoshihiro Maeda and Tamao Ishida It is certified that error appears in the above-identified patent and that said Letters Patent is hereby corrected as shown below:

Column 39,
Line 2, "(in terms of $Mg(OH_2)/g$" should read -- (in terms of $Mg(OH)_2/g$ --.

Signed and Sealed this

Twenty-first Day of June, 2005

JON W. DUDAS
*Director of the United States Patent and Trademark Office*